United States Patent [19]
White

[11] Patent Number: 6,023,393
[45] Date of Patent: *Feb. 8, 2000

[54] SHAPED RAIL OPPOSED SLIDER AIR BEARING CONFIGURATION FOR INCREASED FLYING HEIGHT CONTROL OF MAGNETIC HEADS AT ELEVATED FLEXIBLE DISK SPEEDS

[75] Inventor: James W. White, Los Gatos, Calif.

[73] Assignee: Antek Peripherals, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/891,524

[22] Filed: Jul. 11, 1997

[51] Int. Cl.⁷ .............................. G11B 5/60; G11B 17/32
[52] U.S. Cl. ............................................ 360/103; 360/104
[58] Field of Search ...................................... 360/103, 104

[56] References Cited

U.S. PATENT DOCUMENTS

| | | | |
|---|---|---|---|
| 3,398,870 | 8/1968 | Mullan | 226/97 |
| 4,191,980 | 3/1980 | King et al. | 360/103 X |
| 4,214,287 | 7/1980 | Stromsta | 360/103 |
| 4,315,292 | 2/1982 | Kronfeld | 360/122 |
| 4,414,592 | 11/1983 | Losee | 360/102 |
| 4,700,248 | 10/1987 | Coughlin | 360/103 |
| 4,974,106 | 11/1990 | White | 360/102 |
| 5,229,903 | 7/1993 | Hayakawa et al. | 360/121 |
| 5,235,483 | 8/1993 | Hayakawa et al. | 360/103 |
| 5,359,480 | 10/1994 | Nepela et al. | 360/103 |
| 5,636,085 | 6/1997 | Jones et al. | 360/103 |

FOREIGN PATENT DOCUMENTS

| | | |
|---|---|---|
| 55-052554 | 4/1980 | Japan . |
| 56-083843 | 7/1981 | Japan . |
| 56-501424 | 10/1981 | Japan . |
| 63-32765 | 2/1988 | Japan . |
| 63-152015 | 6/1988 | Japan . |
| 63-181145 | 11/1988 | Japan . |
| 1-116957 | 5/1989 | Japan . |
| 1-185874 | 7/1989 | Japan . |
| 2-046579 | 2/1990 | Japan . |
| 2-247815 | 10/1990 | Japan . |
| 4-067376 | 3/1992 | Japan . |
| 4-205707 | 7/1992 | Japan . |
| 6-028804 | 2/1994 | Japan . |
| 6-076225 | 3/1994 | Japan . |
| 6-096429 | 4/1994 | Japan . |

*Primary Examiner*—William J. Klimowicz
*Attorney, Agent, or Firm*—Townsend and Townsend and Crew LLP

[57] ABSTRACT

The invention provides an exemplary slider arrangement for supporting read and/or write elements in operative relation to a first and a second side of a flexible moving recording medium. The slider arrangement comprises a first slider having leading edge, a trailing edge and a longitudinal axis therebetween. The first slider comprises a first longitudinal rail and a second longitudinal rail. The first and second longitudinal rails each have a face positioned toward the first side of the recording medium. A second slider is provided having an leading edge, a trailing edge and a longitudinal axis therebetween. The second slider comprises a third longitudinal rail and a fourth longitudinal rail which each have a face positioned toward the second side of the recording medium. The first and second sliders are mounted generally opposite each other with the first rail being generally opposite the third rail and the second rail being generally opposite the fourth rail. Further, the first and fourth rails each include at least one longitudinal slot to partition the first and the fourth rails each into at least two sub-rails. At least one of the sub-rails of the first and the fourth rails houses at least one read and/or write element and has at least one portion which varies in width.

52 Claims, 29 Drawing Sheets

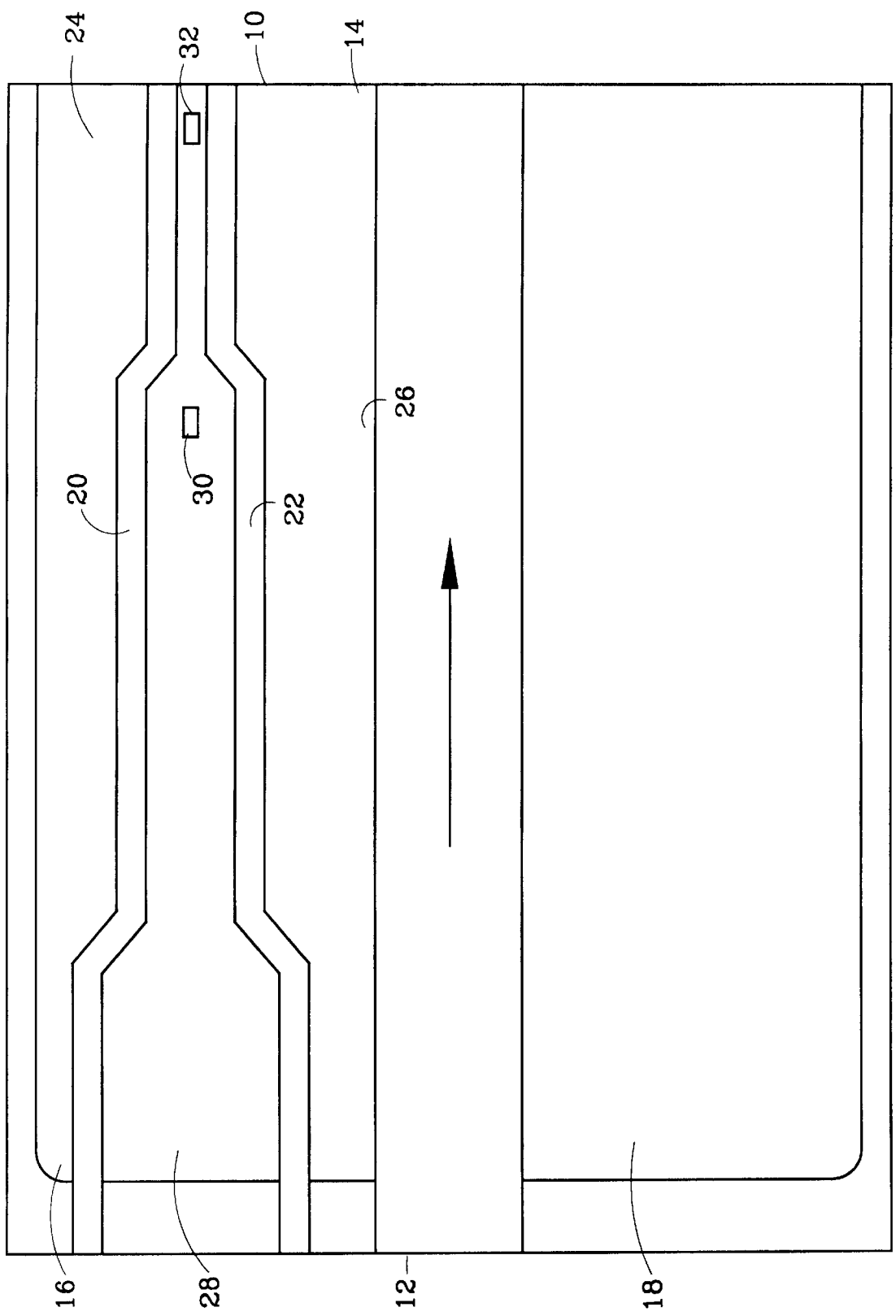

Pressure(atmospheres)

Pressure(atmospheres)

SHAPED RAIL OPPOSED SLIDER AIR BEARING CONFIGURATION FOR INCREASED FLYING HEIGHT CONTROL OF MAGNETIC HEADS AT ELEVATED FLEXIBLE DISK SPEEDS

BACKGROUND OF THE INVENTION

The invention relates generally to the field of disk drive sliders, and in particular to disk drive sliders having read and/or write heads which are used in configuration with flexible recording media. In a preferable aspect, the invention provides for a pair of opposing sliders between which a flexible media is rotated at relatively high speeds.

Current data storage systems employ a wide variety of media to store digital information. One particular recording medium which is of interest is a flexible disk. Traditionally, disk drive systems which were adapted to receive flexible disks employed the use of a read/write head which is normally in contact with the flexible disk. With such systems, low rotational speed of the disk (such as 360 rpm) serves to minimize wear to the contacting surfaces.

In order to increase the amount of data that can be stored on a flexible disk, some have implemented the use of dual sided flexible disk recording devices which utilize recording heads that are generally directly opposed. Usually, one magnetic head slider is fixed normal to the plane of the disk. The opposite slider is typically gimbal-mounted to a support arm and is lightly loaded toward the disk and the fixed-head slider. The gimbal typically allows its slider to translate toward and away from the disk and allows two degrees-of-freedom of slider rotation (called pitch and roll) with respect to the plane of the disk. The typical gimbal thus provides three degrees-of-freedom of motion to the attached slider. At low rotational speeds, a nominally contact condition occurs between slider and disk on both sides of the disk. Due to the low speed, the amount of head and disk wear is controlled to an acceptable level.

Instead of utilizing head/disk contact to ensure close proximity to the flexible disk as is typical in low-speed devices, some have proposed utilizing a head/disk interface which operates without surface contact between the head slider and flexible disk at elevated rotational speeds. Use of such a non-contact head/disk interface allows for increased data transfer rates as well as preventing wear to the disk. Further, by providing a dual head arrangement, increased storage capacity may be provided by allowing for the information to be recorded on both sides of the flexible disk.

U.S. Pat. No. 4,974,106 (the '106 patent), the disclosure of which is herein incorporated by reference, describes an exemplary arrangement for dual-sided recording on a flexible disk which is rotated at relatively high rotational speeds. The '106 patent describes a pair of opposing sliders, each slider having a hydrodynamic pressure pad (HPP) and a longitudinal rail. The two sliders are arranged such that the HPP of each slider will oppose the longitudinal rail of the other slider. Further, each of the longitudinal rails is provided with a pair of longitudinal slots having a uniform width. With this arrangement, pressurized films are developed over both the slotted head longitudinal rail and the HPP, which defines the flying height. Such a film is greater on the side of the HPP and lesser on the side of the slotted longitudinal rail due to the pressurized air flow being bled off through the slots. Further, the pressure force on both sides of the disk is generally equalized with the result being that the air film thickness adjacent to the HPP pushes the disk towards the slotted rail. In this way, the arrangement in the '106 patent allows for a nominally non-contact, low-clearance flying height to allow a flexible media disk drive to operate at about the speed and capacity of a hard media disk drive.

Although the configuration described in the '106 patent has proved to be generally successful, it will be desirable to provide various improvements. For example, when including a read and/or write transducer, such as a high-density transducer, on the rail face near the trailing edge, it is desirable to reduce the fly height value in the immediate vicinity of the high density magnetic transducer while also providing controlled fly height values elsewhere on the slider in order to minimize exposure to contact and wear over the head/disk interface. As another example, it would be desirable to more carefully control the pitch angle of the slider since the pitch angle contributes to the overall stability and reliability of the air bearing film which separates the slider and disk.

In some cases, it will be desirable to provide the longitudinal rail with a high density magnetic transducer in the vicinity of the trailing edge and a low density magnetic transducer which is longitudinally spaced apart from the high density magnetic transducer. With such an arrangement, it will be desirable to be able to control the flying height of the longitudinal rail in both the vicinity of the high density magnetic transducer and in the vicinity of the low density transducer. In this way, the flying height for both transducers may be optimized. In some cases, it would be desirable to provide a slider arrangement which may operate at low fly height values for applications in which a high density magnetic head is deposited at the slider trailing edge. For example, it would be desirable to provide such a configuration which could accommodate thin-film-inductive (TFI) and magnetoresistive (MR) types whose deposit on the slider trailing edge involves techniques common to the semiconductor industry.

SUMMARY OF THE INVENTION

The invention provides exemplary systems and methods for supporting read and/or write elements in operative relation to a moving flexible recording medium. The elastic properties of the recording medium provide not only the flexibility required but also the necessary stiffness required for non-contact flying height control when high speed relative motion exists between the recording heads and recording medium. Although the systems and methods of the invention will preferably be configured to support read and/or write elements in operative relation to both sides of a recording medium, in some cases it may be desirable to provide such read and/or write elements in operative relation to only one side of the recording medium.

In an exemplary embodiment, a slider arrangement is provided which comprises a first slider having a leading edge, a trailing edge, and a longitudinal axis between the leading edge and trailing edge. The first slider comprises a first longitudinal rail and a second longitudinal rail, with the two longitudinal rails each having a face positioned toward a first side of the recording medium. The slider arrangement further includes a second slider having a leading edge, a trailing edge, and a longitudinal axis between the leading and trailing edges. The second slider comprises a third longitudinal rail and a fourth longitudinal rail, with the third and fourth longitudinal rails each having a face positioned toward a second side of the recording medium. A mounting device is further provided to mount the second slider relative to the recording medium substantially opposite of the first slider in a biased manner toward the recording medium. Further, the second slider is mounted such that the first rail is generally opposite the third rail, and the second rail is generally opposite the fourth rail. Further, the first and the fourth rails each include at least one longitudinal slot to partition the first and the fourth rails each into at least two sub-rails. Further, at least one of the sub-rails of the first and the fourth rails houses at least one read and/or write element and has at least one portion which varies in width.

Preferably, the longitudinal slots are each sized sufficiently to maintain a substantially ambient pressure environment within the longitudinal slots during movement of the recording medium. In this way, air films will develop over the second and the third rails to urge the recording medium towards the fourth rail and the first rail, respectively. Further, the longitudinal slots serve to bleed off and convect away a portion of the pressurized air film located between the recording medium and the first and the fourth rails so as to produce a low flying height between the variable width sub-rails of the first and the fourth rails and the recording medium. At least one longitudinal slot may have a variable width. This provides an additional mechanism with which to control slider flying height and angular attitude.

Although the first and the second sliders have been described as each including two longitudinal rails, it will be appreciated that the first and second sliders may be provided with only a single longitudinal rail, with one of the longitudinal rails being slotted. With such an arrangement, the slotted rail would include a read and/or write element to read and/or write data to or from a single side of the recording medium.

In one particularly preferable aspect, the first and the fourth rails each include two longitudinal slots which partition the first and the fourth rails each into two outer sub-rails and a central sub-rail. With such an arrangement, the central sub-rails may be employed to house the read and/or write elements. For example, a high density magnetic transducer may be mounted to the face of the central sub-rail near the trailing edge. Optionally, a low-density magnetic transducer may also be attached to the central sub-rail between the leading edge and the trailing edge. With this arrangement, high density magnetic data transfer may be provided at a high rotational disk speed utilizing a specified first flying height in the vicinity of the high density transducer and low density data transfer may be provided at a specified second flying height in the vicinity of the low density magnetic transducer, i.e., the flying height in the vicinity of both the high density magnetic transducer and the low density magnetic transducer may each be precisely controlled. Further, such a configuration provides stability to the sliders by providing a desired pitch angle relative to the disk such that minimal slider/disk contact will occur during full speed rotation of the disk.

In one alternative aspect, the read and/or write element may comprise a thin film inductive head or a magnetoresistive head which is attached to the central sub-rail at the trailing edge. In this way, the slider configuration may be employed to fly the high density magnetic head at a low flying height, with the magnetic head being deposited at the slider trailing edge using techniques common to the semiconductor industry.

In another aspect, each central sub-rail has at least one portion which increases in width toward the trailing edge. In another aspect, the central sub-rail has at least one portion which increases in width toward the trailing edge and another portion which decreases in width toward the trailing edge. In still another aspect, each central sub-rail has at least one portion which decreases in width toward the trailing edge.

In another particularly preferable aspect, each central sub-rail has a width which increases near the trailing edge so as to produce sub-ambient pressure over a portion of the first and the fourth longitudinal rails. In still another aspect, each central sub-rail has a width which increases near the trailing edge, and the two longitudinal slots of the first and the fourth rails are each connected by a cross-slot having a width and a depth to provide substantially ambient pressure within each cross-slot during movement of the recording medium. In this way, sub-ambient pressure is produced over a portion of the first and the fourth longitudinal rails in the proximity of the trailing edges.

In yet another aspect, the two longitudinal slots of the first and the fourth longitudinal rails are each connected by an additional slot. Preferably, each additional slot has a width and a depth sufficient to provide substantially ambient pressure within each additional slot during movement of the recording medium.

In still yet another aspect, at least a portion of one of the two longitudinal slots of either the first longitudinal rail or the fourth longitudinal rail has a variable width. Alternatively, at least a portion of each longitudinal slot may be provided with a variable width. In another alternative, each longitudinal slot may be provided with a constant width.

In another exemplary aspect, a mounting device is provided to mount the first slider relative to the recording medium substantially opposite of the second slider in a biased manner toward the recording medium. In this way the first slider is movable toward and away from the recording medium.

In another exemplar aspect, separate mounting devices are provided on each side of the recording medium for positioning the two sliders opposite each other and relative to the recording medium in a biased manner toward the recording medium. In this aspect, the first slider and the second slider are each movable toward and away from the recording medium.

In another aspect, the slider arrangement is mounted to a rotatable arm and is positioned over the recording medium surface according to a rotary motion. In another aspect, the slider arrangement is mounted to an arm and is positioned by a stepper motor over the recording medium surface according to a linear motion.

The invention further provides an exemplary method for supporting read and/or write elements in operative relation to two sides of a moving recording medium. According to the method, a first slider is provided having a leading edge, a trailing edge, and a longitudinal axis therebetween. The first slider comprises a first longitudinal rail and a second longitudinal rail. A second slider is also provided having a leading edge, a trailing edge, and a longitudinal axis therebetween. The second slider comprises a third longitudinal rail and a fourth longitudinal rail. The first and second sliders are arranged such that the recording medium is positioned between them, with the first rail being generally opposite the third rail and the second rail being generally opposite the fourth rail. Further, the first and the fourth rails each include at least one longitudinal slot to partition the first and the fourth rails each into at least two sub-rails. Moreover, at least one of the sub-rails of the first and the fourth rails houses at least one read and/or write element and has at least one portion which varies in width. The recording medium is rotated while maintaining a substantially ambient pressure environment within the longitudinal slots. As the recording medium is rotated, air films develop over the second and the third rails to urge the recording medium toward the fourth rail and the first rail, respectively. Further, the longitudinal slots bleed off and convect away a portion of the pressurized air film located between the recording medium and the first and the fourth rails so as to produce a low flying height between the variable width sub-rails of the first and the fourth rails and the recording medium.

Preferably, the recording medium is rotated at a speed above about 2,000 rpm. In one particularly preferable aspect, the sub-rails having the variable width portions each house two read and/or write elements, with one of the elements comprising a low density transducer and the other element comprising a high density transducer. Preferably, the first and the second sliders will each be maintained in a stable orientation with a desired pitch angle relative to the recording medium.

In another particularly preferable aspect, the low density transducer will be maintained at a specified first flying height and the high density transducer will be maintained at a specified second flying height relative to the recording medium during rotation of the recording medium. In this way, the slider configuration allows for both the pitch angles to be controlled as well as the fly height at both the low density transducer and the high density transducer.

In still another aspect, the first and the fourth rails each include two longitudinal slots to partition the first and the fourth rails each into two outer sub-rails and a central sub-rail. In still another aspect, the read and/or write element comprises a thin film inductive head or a magnetoresistive head which is attached to the central sub-rail at the trailing edge.

In another embodiment, the invention provides an exemplary disk drive system which comprises a housing and a recording medium operatively mounted within the housing. Further, the recording medium has both a first side and a second side. A slider arrangement is further provided for supporting at least one read and/or write element in operative relation to the first and second sides of the recording medium. The slider arrangement comprises a first slider having a first longitudinal rail and a second longitudinal rail, and a second slider having a third longitudinal rail and a fourth longitudinal rail. The first and second sliders are mounted relative to the recording medium such that the first rail is generally opposite the third rail and the second rail is generally opposite the fourth rail. Further, the first and the fourth rails each include at least one longitudinal slot to partition the first and the fourth rails each into at least two sub-rails. Further, at least one of the sub-rails of the first and fourth rails houses the read and/or write element and has at least one portion which varies in width.

BRIEF DESCRIPTION OF THE DRAWINGS

FIG. 1 is a top view of an exemplary slider having a variable width central sub-rail according to the invention.

DETAILED DESCRIPTION OF THE SPECIFIC EMBODIMENTS

Figure 1A:
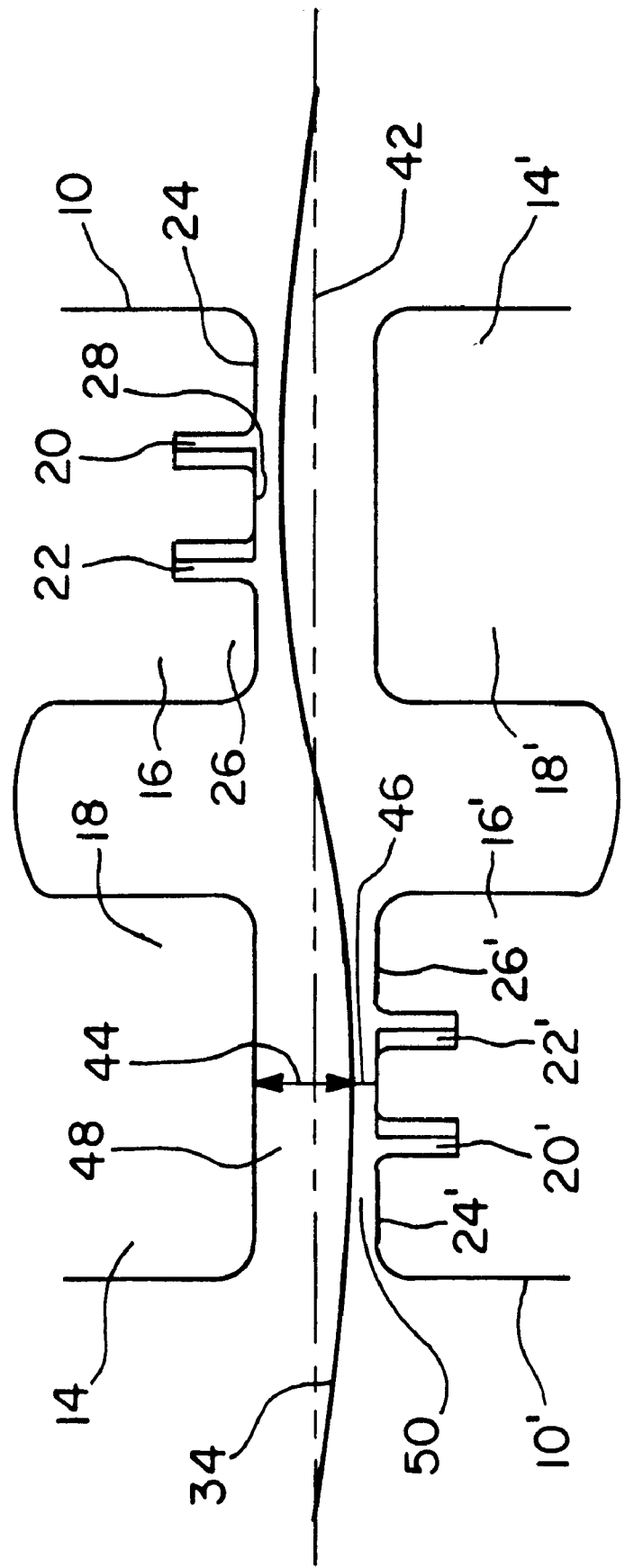
FIG. 1A is a cross-sectional end view of a pair of opposing sliders, each of which is essentially identical to the slider of FIG. 1.

The invention provides exemplary slider arrangements and methods which operate without substantial surface contact between the sliders, their recording heads, and a flexible disk when operated at elevated rotational speeds, preferably above about 2,000 rpm. One embodiment of the invention provides a slider arrangement having the ability to provide high density magnetic data transfer at high disk rotational speeds utilizing a specified first flying height, as well as the ability to provide low density magnetic data transfer to and from a flexible disk utilizing a specified second flying height, while also maintaining the opposing slider in a stable orientation with a desired pitch angle relative to the disk. In this way, minimal slider/disk contact will occur during full speed rotation.

The embodiments set forth in the invention are intended as improvements over those described in the '106 patent, previously incorporated by reference, which utilize only uniform width, straight longitudinal rails and only uniform width, straight longitudinal ambient pressure slots. The improvements of the invention are directed to certain longitudinal rail and slot configurations that are typically not uniform in width nor necessarily straight.

The invention provides for both single and dual recording head (alternatively referred to as read/write elements) configurations for magnetic recording at elevated disk rotational speeds. The invention includes a slider rail having a longitudinally slotted air bearing configuration on one side of a flexible disk, opposed by a hydrodynamic pressure pad (HPP) on the opposite side of the disk. Each longitudinal slot preferably originates at a rail leading edge and terminates at a rail trailing edge. The pressure maintained in the longitudinal slot is substantially the ambient pressure level upstream of the slider arrangement.

Although the longitudinal slot of the invention may have a variable length, width, and/or depth, it will preferably possess some of the air bearing characteristics of the longitudinal slot disclosed in the '106 patent. One such feature is the ability to collect pressurized "bleed off" air flow as well as sub-micron-sized particles (which are driven into the slot by the air flow pressure gradients) from adjacent air bearing surfaces, and to channel this air flow/particle mixture to the slider exit where it is convected away by the disk motion. Another useful characteristic of the longitudinal slot is that it will also serve to provide an upstream ambient pressure boundary condition on certain diverging air bearing rail edges. This arrangement enables a relatively wide rail section to be positioned in close noncontact proximity to a flexible disk rotating at elevated speeds.

In one embodiment, the invention provides advantages to slider arrangements which house only a high density head (transducer) mounted into the face of a slider rail or which house both high density and low density heads that are mounted into the face of a slider rail. In another embodiment, the invention provides air bearing slider configurations which can be used for applications in which the high density magnetic head is deposited at the slider trailing edge. Such heads can include, for example, thin film inductive (TFI) and magnetoresistive (MR) types whose deposit on the slider trailing edge involves techniques common to the semiconductor industry.

The HPP of the invention typically comprises a relatively flat pad with a converging inlet and side edge blending (rounding). The converging inlet serves to pressurize the incoming air flow due to disk rotation and to create a non-contact condition. The edge blend typically serves to minimize contact and wear between a slider and disk during both static and dynamic operating conditions. However, it will be appreciated that other air bearing surface shapes could also be used for the HPP. The HPP will preferably be constructed so that the flying height level will be considerably higher than the flying height level directly opposing the HPP on the other side of the disk in order to produce a minimum drag force on the disk surface and to provide minimum contact between the disk and slider surfaces. The average flying height over the HPP should be at least several times the flying height level at the high density transducer of the slider rail on the opposing side of the disk (which is typically located near the trailing edge of the slider rail).

One particularly preferable embodiment of the invention utilizes a slotted rail having two longitudinal ambient pressure slots. Each longitudinal slot preferably originates at the rail leading edge and terminates at the rail trailing edge. In this way, the longitudinal ambient pressure slot will be fed by incoming ambient pressure air flow at the rail leading edge and will discharge air flow at the rail trailing edge to an ambient pressure condition. A typical range of slot widths is between about 0.001 inch and about 0.010 inch, although other values could be used. The ambient slots will preferably have a depth of at least 40 microinches, more preferably at least 80 microinches, and still more preferably greater than about 120 microinches. Typically, it will be preferred to have deeper slot depths, particularly as technology improves, to make the manufacture of such slots more economical. The deeper slot depth provides a closer approximation to a desired uniform ambient pressure condition throughout the full length of the slot. However, it will be appreciated that other values could be used for the slot depth.

A typical slotted rail will include a central longitudinal sub-rail (CSR) or a central face bordered on each of its transverse edges by an ambient longitudinal slot (ALS). Beyond each ALS is an outer longitudinal sub-rail that provides air bearing support, usually at a higher clearance than the CSR. The CSR will preferably house the magnetic transducer (or transducers) for high speed data transfer. The CSR is preferably shaped, configured and dimensioned so as to produce the desired flying height levels at each separate transducer location along the CSR. The CSR will preferably also have a relatively flat face with a converging inlet. Further, the CSR may be shaped so as to provide a desired angular pitch orientation to the slider during flight.

The two outer sub-rails will preferably have a simple geometry such as a flat pad with a converging inlet and edge blend along at least the side edge of the outer sub-rail that is coincident with one of the slider outside edges so as to minimize slider-disk contact and wear during high speed rotation. Small amounts of curvature may occur on the surfaces of the air bearing rails (as well as the HPP) and tend to promote a condition of decreased wear between the slider and disk. A typical value of surface curvature causes a slider face to deviate from a plane surface by less than 5 microinches. Other geometries for the sub-rails could also be used which would provide an adequate function.

Typical manufacturing processes used for the creation of the ambient longitudinal slots will preferably include ion milling, reactive ion etching, laser etching, chemical etching, and the like. Machining may also be possible in some cases.

The low density transducer will preferably be located sufficiently upstream of the slider trailing edge so as to expose the low density transducer to a moderate level of flying height at full speed rotation, such as 5 microinches, since the low recording density does not require a relatively low flying height value. The typical flying height profile of an air bearing slider is such that the flying height decreases from slider leading edge to trailing edge due to the tendency of the slider to fly at a positive pitch angle relative to the disk during stable flight. Such a characteristic leads to the placement of the high density transducer in the vicinity of the slider trailing edge since high density recording typically requires a relatively low flying height value. A typical range of current high density recording flying height values is between about 1 and 2 microinches. However, the trend is toward lower flying height values as the demand for increased storage capacity continues.

The slider of the invention will preferably produce the required flying height value in the immediate vicinity of the high density magnetic transducer while providing higher flying height values elsewhere in order to minimize exposure to contact and wear over the head/disk interface. Dynamic stability should also be provided to the slider when operating at the flying height since the slider will typically be exposed to off-design conditions and will move to access different data tracks. A highly controlled slider pitch angle is desired since it contributes to the overall stability and reliability of the air bearing film which separates the slider and disk.

The sliders described in the '106 patent allow the flying height at a first magnetic transducer to be produced by the proper selection of rail width and slot width. However, when the air bearing is configured with only uniform width straight rails and only uniform width straight slots, the flying height at a second transducer, such as the low density transducer, may then not be at an optimum or even acceptable value. Further, the slider pitch angle produced may not be adequate. However, by designing a variable width and possibly a variable direction into the CSR as well as the ambient longitudinal slots (ALS), additional geometric parameters are made available to allow satisfaction of the required flying height level at each magnetic transducer as well as satisfaction of the desired pitch angle.

Referring now to FIG. 1, an exemplary embodiment of a slider 10 will be described. The slider shown in FIG. 1 is also shown in perspective view in FIG. 1D. Slider 10 comprises a leading edge 12, a trailing edge 14, a first longitudinal rail 16 and a second longitudinal rail 18. First longitudinal rail 16 includes a pair of ambient longitudinal slots (ALS) 20 and 22 to partition first longitudinal rail 16 into two outer sub-rails 24 and 26 and a central sub-rail (CSR) 28. Second longitudinal rail 18 is unslotted and functions as a hydrodynamic pressure pad (HPP). Slider 10 further includes a pair of magnetic transducers 30 and 32 which are mounted to CSR 28. Preferably, transducer 30 will be a low density transducer while transducer 32 will be a high density transducer.

CSR 28 decreases in width in the direction of disk motion as illustrated in FIG. 1. The length and width of the upstream section of CSR 28 (i.e., near leading edge 12) will preferably be configured to provide a desired slider pitch angle. Further, proper selection of the length and width of a central portion of CSR 28 (which contains low density transducer 30) allows the correct amount of pressurized air flow bleed-off from CSR 28 and adjustment of flying height so as to satisfy the flying height requirement of low density transducer 30. Further, proper selection of the length and width of the downstream section of CSR 28 (which contains high density transducer 32) allows sufficient bleed-off of pressurized air into the surrounding ALSs 20, 22, and reduction of flying height to satisfy the flying height requirement of high density transducer 32. Hence, by varying the width of CSR 28 along the length of first longitudinal rail 16, slider 10 may be configured to operate with a desired slider pitch angle, a desired flying height in the region of transducer 30 and another desired flying height in the region of transducer 32.

Figure 1B:
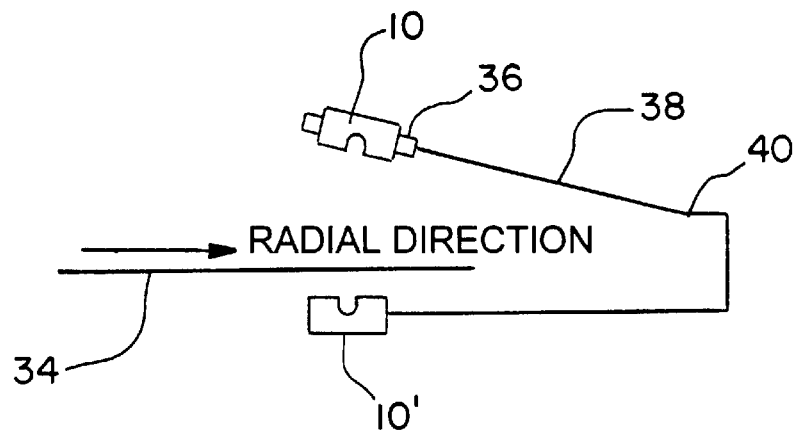
FIG. 1B is a schematic illustration of a mounting system used to mount the opposing sliders of FIG. 1A.
Figure 1C:
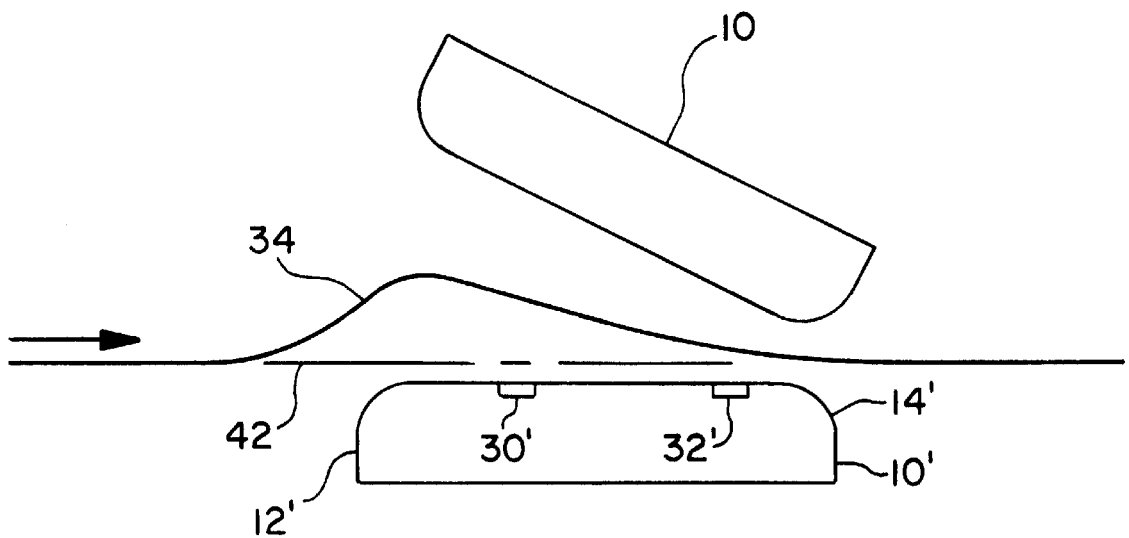
FIG. 1C is a side view of the two opposing sliders of FIG. 1A.
Figure 1D:
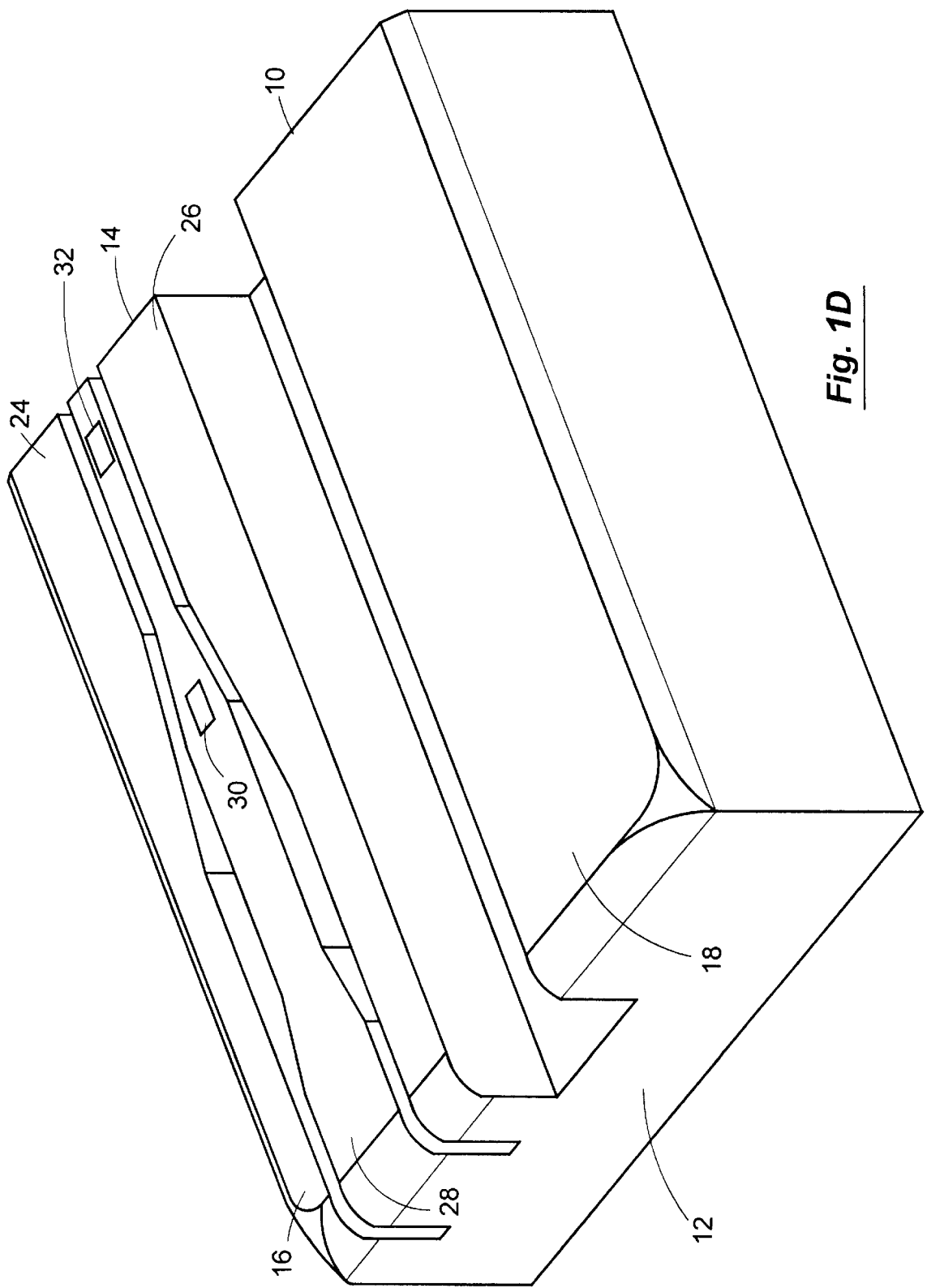
FIG. 1D is a perspective view of the slider shown in FIG. 1.

Operation of slider 10 to achieve an optimal slider pitch angle and flying height both in the regions of transducers 30 and 32 will be described with reference to FIGS. 1A through 1C. In FIG. 1A, slider 10 is shown positioned substantially opposite a slider 10' which is constructed essentially identical to slider 10. In FIG. 1A, sliders 10 and 10' are viewed from their respective trailing edges 14 and 14'. A flexible disk 34 is rotatable between the two sliders. Mounting of sliders 10 and 10' is illustrated in FIG. 1B where slider 10' is maintained at a fixed (or gimbal-mounted, usually with a relatively stiff suspension) position normal to plane of disk 34, even though the slider moves to different positions over the surface of disk 34. Slider 10 (the top slider) is gimbal-mounted 36 to a support structure 38 which is movable toward and away from the plane of disk 34. An applied load 40 of support structure 38 urges slider 10 toward disk 34 and disk 34 thus becomes positioned in relative proximity to both sliders 10 and 10'.

As shown in FIG. 1A, unslotted rail 18 of slider 10 opposes slotted rail 16' of slider 10'. Similarly, slotted rail 16 of slider 10 opposes unslotted rail 18' of slider 10'. For each slider 10, 10', the unslotted rail 18, 18' functions as a hydrodynamic pressure pad (HPP). The combination of the HPP and opposite slotted rails 16, 16' function as follows: Air bearing pressure and load support between sliders 10, 10' and disk 34 is developed by the relative motion between sliders 10, 10' and disk 34 and by the "wedge effect" created by the non-parallel orientation between sliders 10, 10' and disk 34.

Due to the global flexibility of disk 34 normal to its own plane 42, disk 34 offers little transverse resistance to pressure loading over fairly wide areas. Disk 34 will position itself, relative to its own plane 42, so as to produce a condition of force and moment equilibrium for static flying operation. Over unslotted rails 18, 18', the pressure tends to be fairly uniform and the slider-to-disk clearance, or flying height 44, is considerably higher than the flying height 46 which will be developed over slotted rails 16, 16'. Configuration of the length and width of CSR 28 for the upstream section, the central section (containing the low density transducer) and the downstream section (which contains the high density transducer) allows sufficient bleed-off of pressurized air into the surrounding ALSs 20, 22 to optimize the pitch of the slider (as illustrated in FIG. 1C) and the flying height both at low density transducer 30 and high density transducer 32.

Another advantage of employing the HPP on sliders 10 and 10' is that the resulting air bearing stiffness of an unslotted air film 48 adjacent rail 18 is considerably less than the air bearing stiffness of a slotted air film 50 of slotted rail of 16'. This characteristic causes the surface of disk 34 to locally deform to allow convective passage of submicron-sized particles through air film 50 adjacent slotted rail 16'. The air film adjacent unslotted rail 18 offers little resistance as disk 34 dynamically translates away from the surface of slotted rail 16' to enlarge the airflow area of air film 50 and to allow particle passage as described in the '106 patent, previously incorporated by reference.

Although the width of the CSR section may vary depending upon the particular application, typical widths for the CSR section are between about 0.0005 inch and about 0.015 inch.

Figure 2:
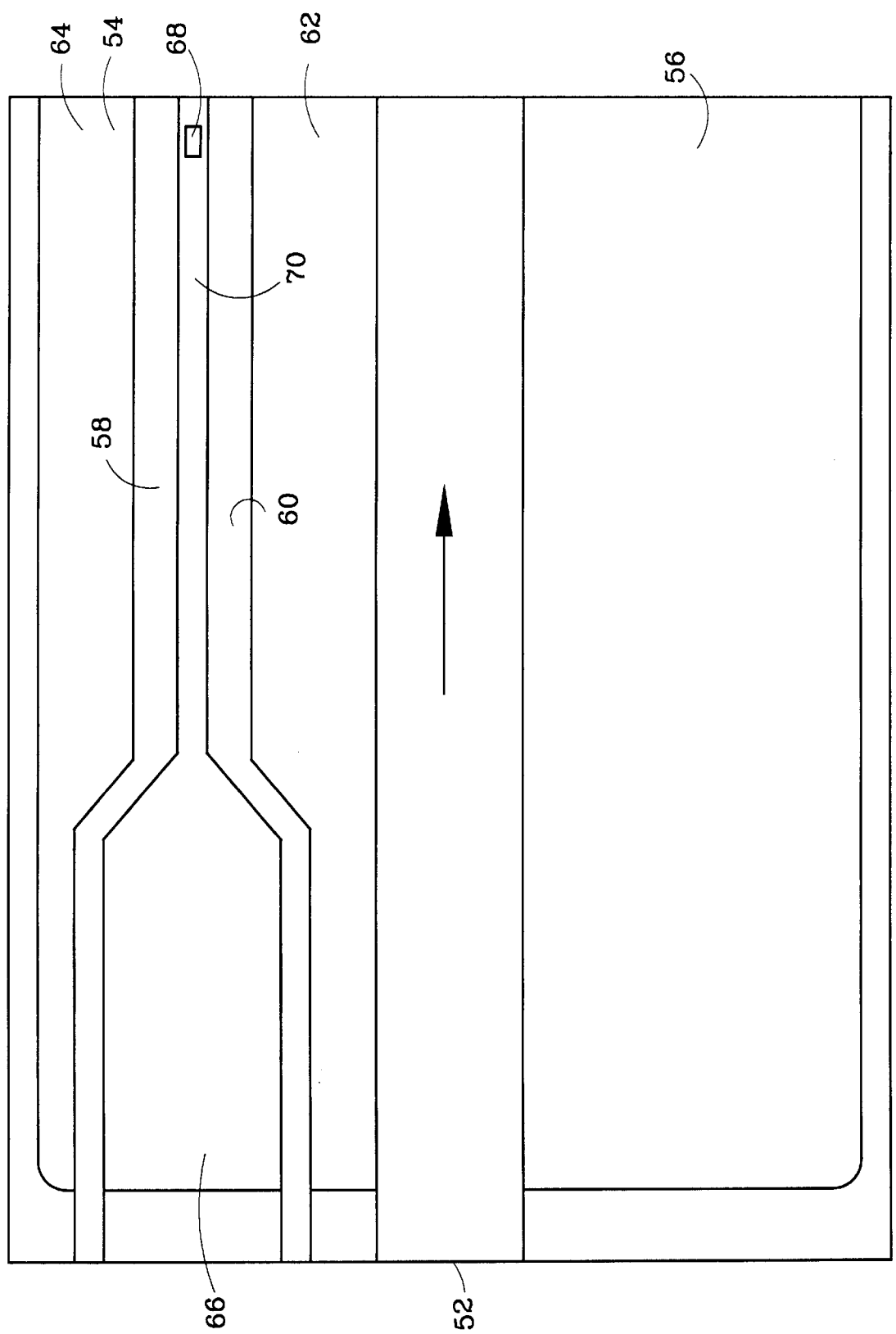
FIG. 2 is a top view of an alternative embodiment of a slider having a variable width central sub-rail according to the invention.

Referring now to FIG. 2, another exemplary embodiment of a slider 52 will be described. Slider 52 comprises a first or slotted longitudinal rail 54 and a second or unslotted longitudinal rail 56 which serves as an HPP. Longitudinal rail 54 includes a pair of longitudinal slots 58, 60 to partition rail 54 into two outer sub-rails 62, 64 and a CSR 66. Slider 52 is particularly well suited for housing a single, high density transducer 68 which is integrated into a face 70 of CSR 66. CSR 66 is configured so that it has a wider width at the leading edge and a decreased width downstream of the leading edge which contains transducer 68. An example of such a transducer is a ferrite metal-in-gap (MIG) which is preferably glass-bonded to face 70.

Figure 3:
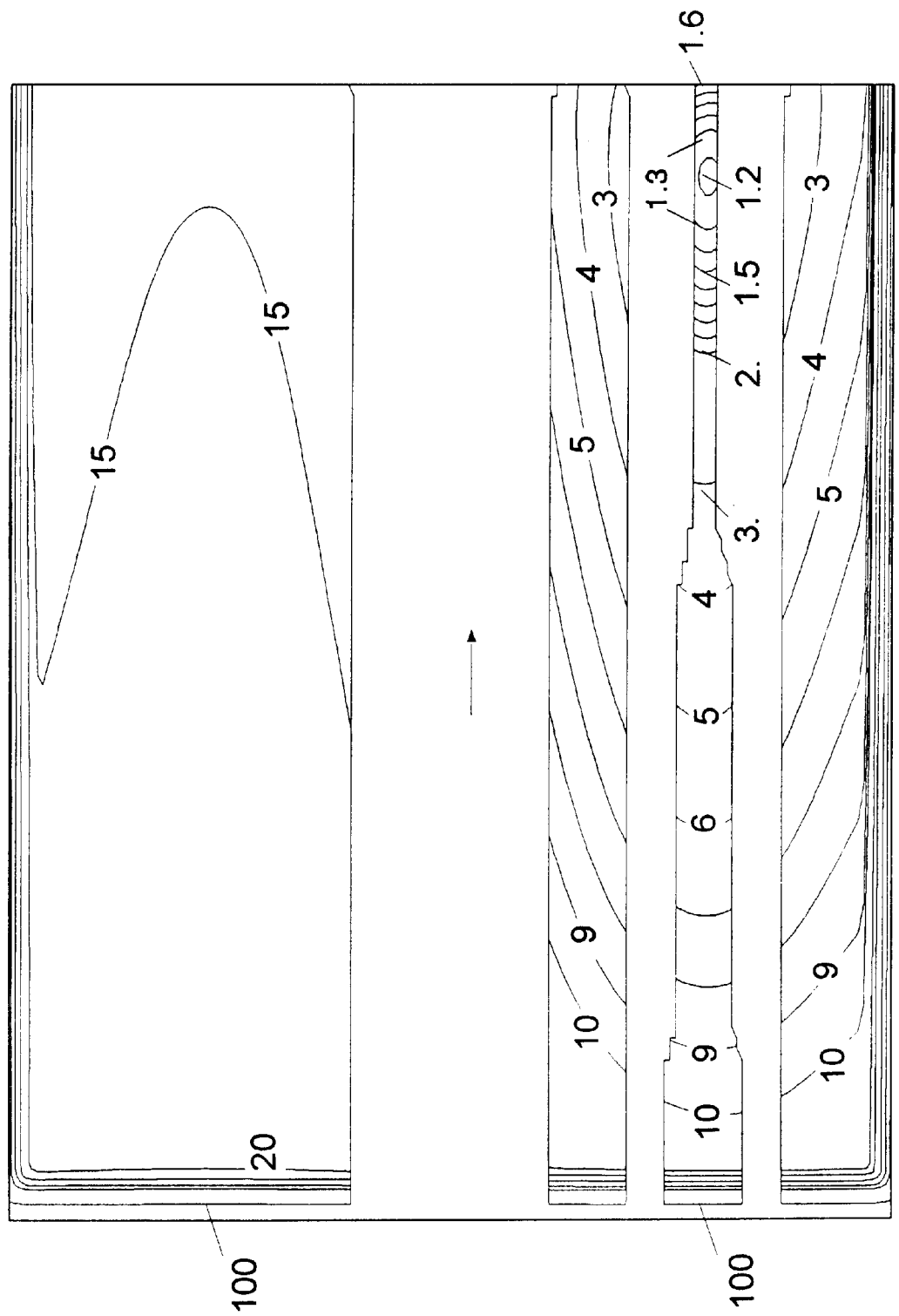
FIG. 3 depicts flying height contours of the slider of FIG. 1 when opposing a similar slider and when a flexible disk is rotated between the two sliders.

Referring now to FIG. 3, typical operation of a pair of sliders which are arranged similar to the arrangement illustrated in FIG. 1A, will be described. In particular, FIG. 3 illustrates flying height contours projected onto a slider arrangement which is similar to slider 10 of FIG. 1 when operated opposite a similar slider. Further, each slider includes a high density and a low density transducer mounted to the face of the CSR in a manner similar to that previously described in connection with FIG. 1. The flying height contours of FIG. 3 were produced using the AIRBEAR2 air bearing finite different simulation code authored by applicant. (Other cases described hereinafter have also been simulated using the AIRBEAR2 code.)

The sliders employed in the simulation depicted in FIG. 3 are of the 50% industry standard size (0.081 inch by 0.061 inch) and fly on a 0.0025 inch thick flexible disk which rotates at 3600 rpm. The disk elastic modulus is 600,000 psi. In the example of FIG. 3, one slider is maintained at a fixed position normal to the plane of the disk, even though the slider moves to different radial positions (data tracks) over the surface of the disk. The face of the fixed position slider is located to coincide with the plane of the disk similar to the arrangement in FIG. 1C. Such an orientation is referred to as the condition of zero-penetration. The opposite slider is gimbal-mounted to a support structure which is movable both toward and away from the plane of the disk. The opposite slider mechanical structure provides an external force of 4 grams to create the low clearance air bearing interface between the two sliders and the moving disk. Each slider contains both a high density and a low density transducer mounted into the face of each CSR. The CSR width is 0.006 inch over a length of 0.010 inch, beginning at the slider leading edge, 0.004 inch over a length of 0.030 inch for a central section, and 0.002 inch over a length of 0.031 inch for the exit section. Each outer sub-rail width is 0.006 inch, and the outer side edge of each slider contains a blended surface of 0.002 inch width. The slider leading edge is blended over a length of 0.004 inch to enhance development of the air bearing effect. Each slot outer boundary is straight while the slot inner boundaries each coincide with a CSR side edge. From the slider leading edge to trailing edge, the width of each slot changes from 0.002 inch, to 0.003 inch, and to 0.004 inch.

The flying height contours, based on numerical simulation, for one of the sliders at a disk radius of 1.2 inches, are presented in FIG. 3. In order to emphasize the reverse symmetry configuration of the air bearing surfaces of the two opposing sliders, simulation results for this case and others are presented for the slider which is opposite the particular slider shown. The flying height contours are seen to provide a minimum value of around 1.2 microinches at a location which would contain the high density transducer, and around 5 microinches, at the location which would contain the low density transducer. With this arrangement, the slider pitch angle is 94 microradians relative to the disk. Such a slider pitch angle is an adequate value in order to ensure a sufficiently inclined slider inlet.

The accuracy of the flying height contour plot of FIG. 3 is limited along irregular, or slanted, boundaries or edges (such as the CSR side section edges) because of the plot code used which employs a uniform rectangular grid. However, actual simulation results from the AIRBEAR2 code are typically more accurate than a portion of the plot of FIG. 3 implies. Such a limitation on contour plots will also apply to later results presented hereinafter.

Figure 4:
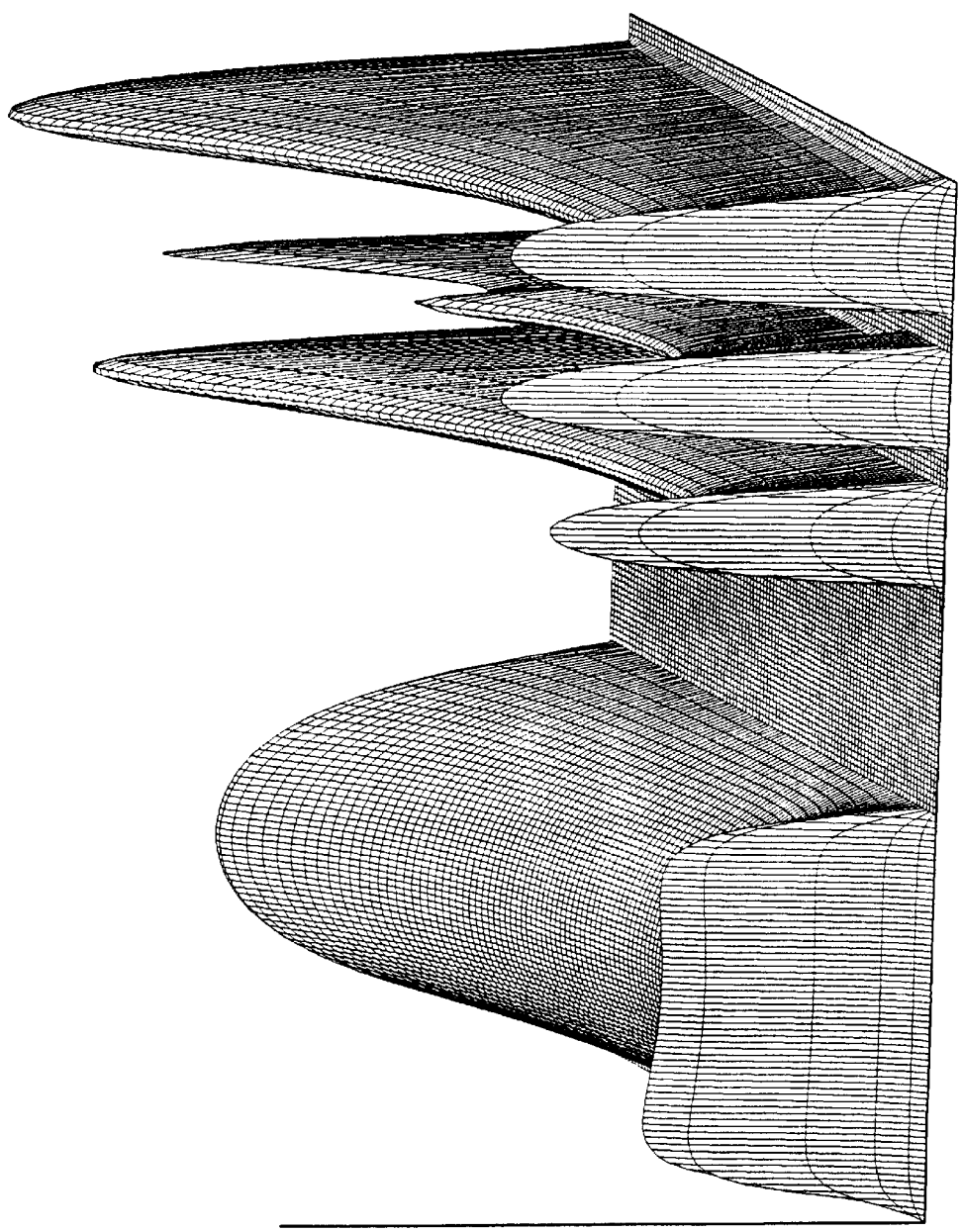
FIG. 4 is a three-dimensional plot of the air bearing pressure developed over the slider of FIG. 3.
Figure 5:
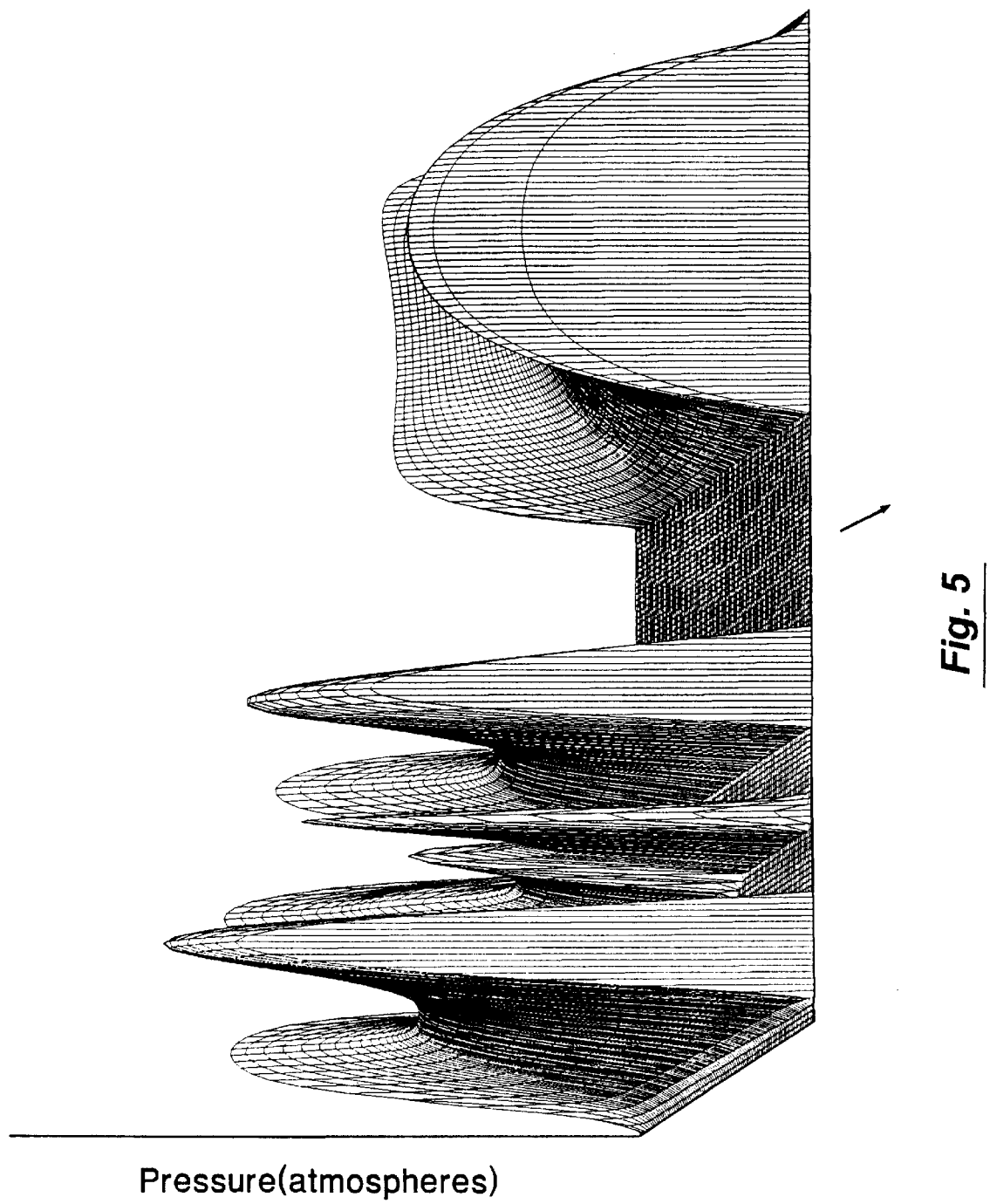
FIG. 5 illustrates the plot of FIG. 4 rotated 180 degrees.

Three dimensional plots of the air bearing pressure over the slider of FIG. 3 are presented in FIGS. 4 and 5. Viewed from the slider inlet, at each longitudinal location where the CSR width decreases, the pressure is seen to decrease, followed by an increase further downstream. Such a condition results because a decrease in CSR width causes an increase in pressurized air flow bleed-off into the adjacent, ambient longitudinal slots (due to the increased magnitude of transverse pressure gradient) and results in a pressure expansion over the CSR section in the downstream direction. This in turn causes the flying height to decrease in the downstream direction because there is now less pressure support acting on the flexible disk surface. Further downstream, but subject to the same CSR width, the positive slider pitch angle (which causes a decreasing flow area) tends to produce a compression effect to the air flow (in order to satisfy conservation of air mass flow rate) which eventually overcomes the expansion effect from upstream, resulting in a pressure increase. This compression effect is also present on the outer sub-rails adjacent to the ALSs and is primarily explained by the positive slider pitch angle. The influence of the complex fluid dynamics motions on the air flow pressure is evident along the CSR and outer sub-rail sections of FIGS. 4 and 5.

For sliders housing a high density transducer which is either a thin film inductive (TFI) head or a magneto-resistive (MR) head and which is deposited at the slider trailing edge, the air bearing configuration for a low flying height value at the high density transducer is different from that for an MIG head that is glass-bonded into the CSR face. In order to accommodate the larger size of the TFI or MR transducer deposited at the slider trailing edge, the CSR width at the slider trailing edge may need to be considerably wider than the CSR width at the location of a MIG transducer. However, if the CSR width was made uniform according to the '106 patent disclosure, the resulting flying height value of a TFI or MR head would be unacceptably high.

Figure 6:
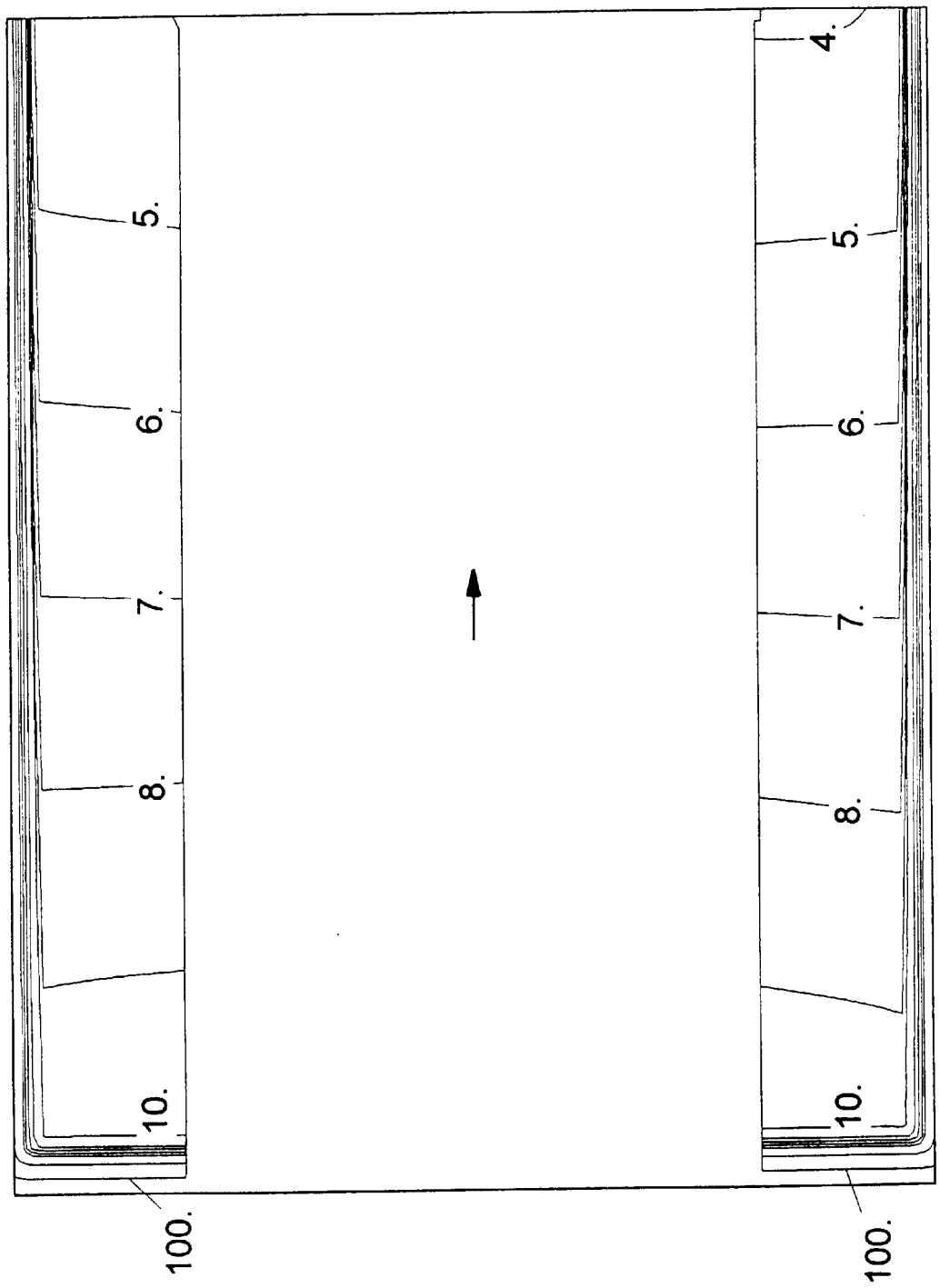
FIG. 6 illustrates the flying height contours for a slider which opposes another slider with each slider having a pair of uniform width outer rails.

To illustrate this condition, consider the case where the CSR width is 0.0096 inch and uniform along the slider length. The physical size of the magnetic transducer in this example requires that the CSR width be this value or larger. All other parameters are the same as those considered in the example of FIG. 3. The flying height of a pair of opposed two-rail sliders with uniform 0.0096 inch width rails was simulated with the AIRBEAR2 code. The resulting flying height contours of one of the sliders are presented in FIG. 6. As shown, flying height at the slider trailing edge is around 4 microinches, which is unacceptably high compared to the currently required flying height value of around one to two microinches for the TFI or MR head.

Figure 7:
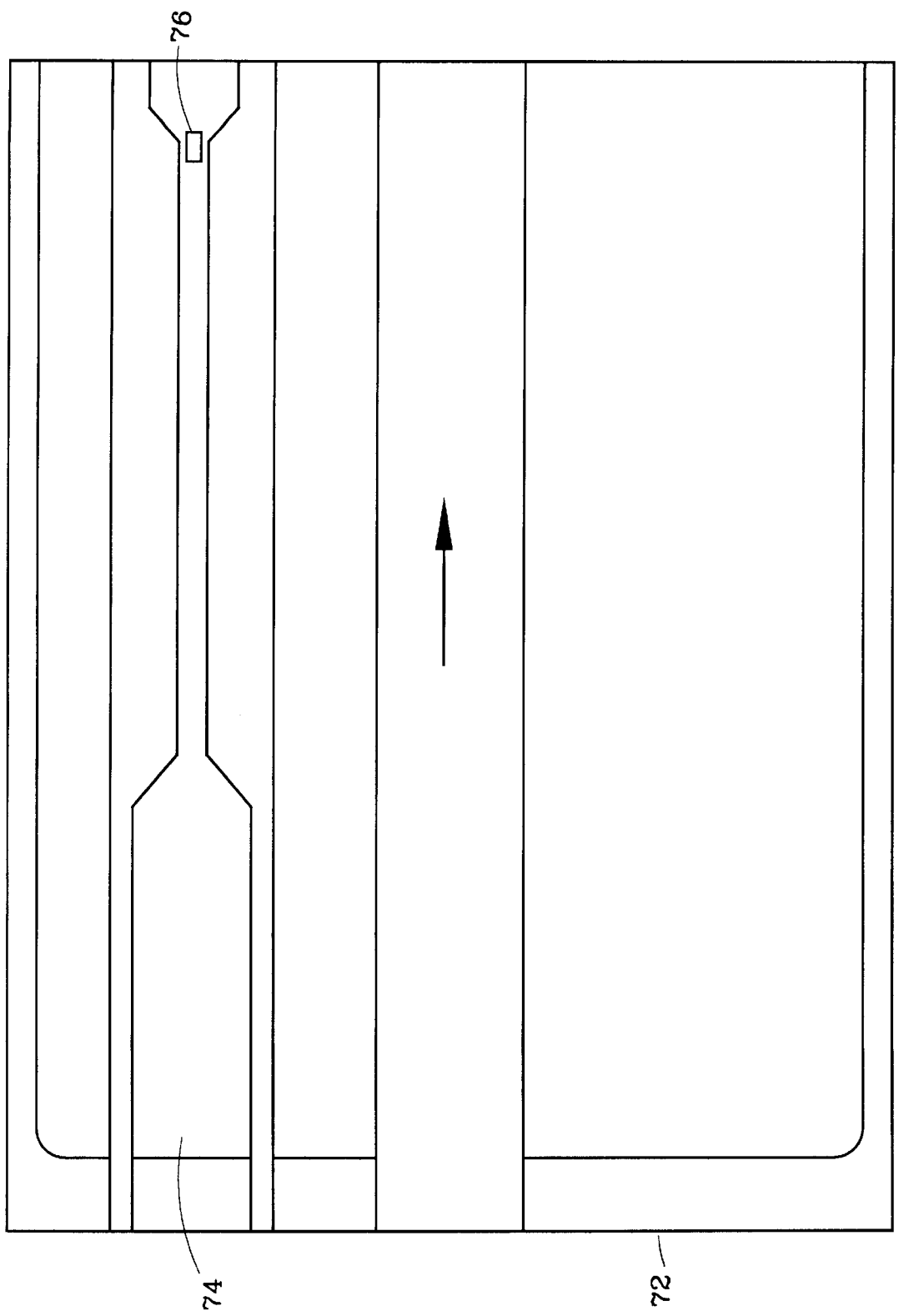
FIG. 7 is a top view of another exemplary embodiment of a slider having a variable width central sub-rail according to the invention.

If the MIG head flying height (and not necessarily the slider pitch angle) needs to be controlled, the width of an otherwise uniform width CSR rail may be narrowed only in the vicinity of the head in order to allow a sufficient mass flow rate of pressurized air to be driven into the adjacent ALSs by transverse pressure gradients. An exemplary slider 72 which is constructed in this manner is illustrated in FIG. 7. Slider 72 may be constructed to be similar to slider 10 except for the configuration of a CSR 74 which includes a MIG head 76 mounted to its face as just described.

Figure 8:
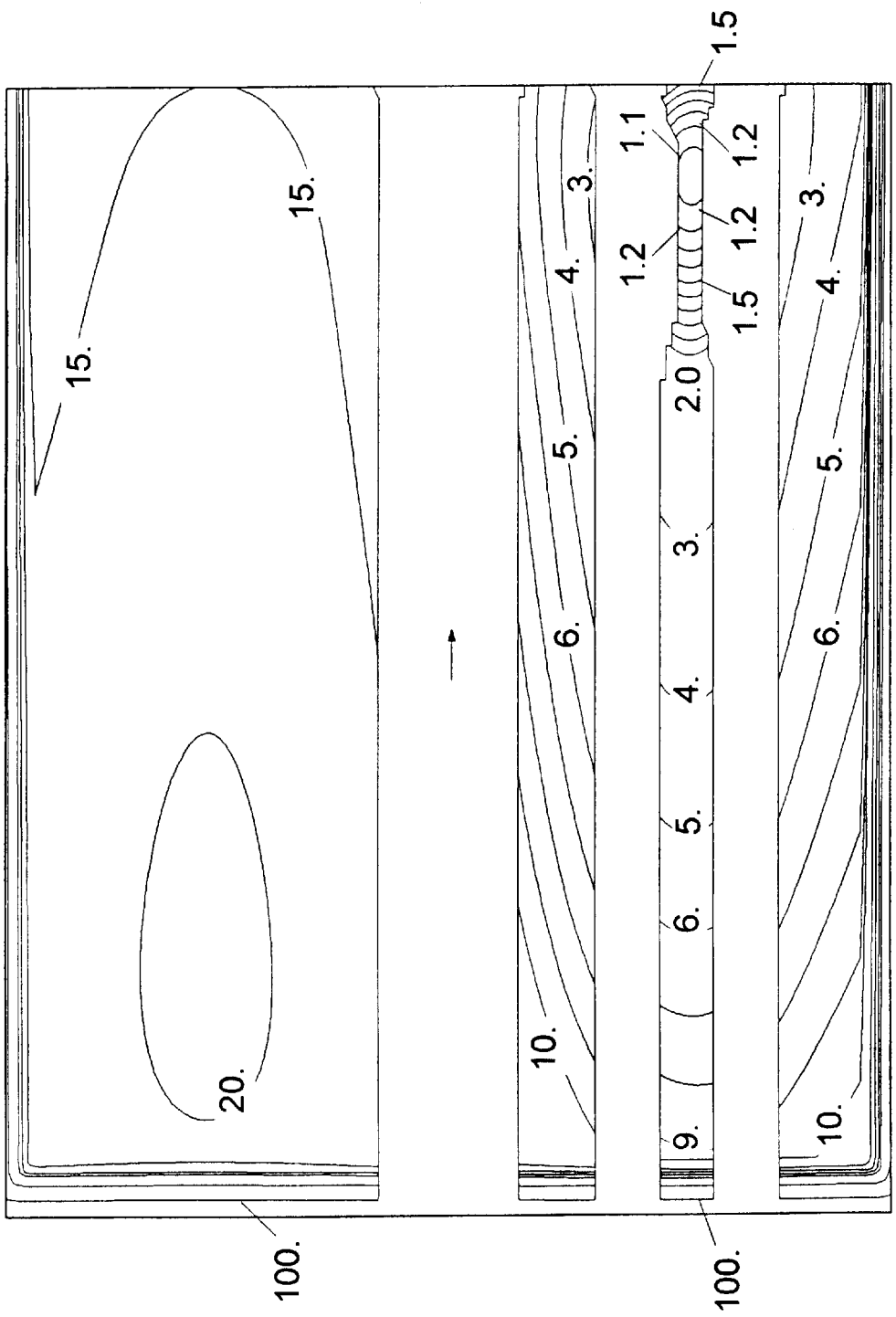
FIG. 8 illustrates a flying height contour plot for the slider of FIG. 7 when opposing a similar slider and when a flexible disk is rotated between the two sliders.

A simulation example of a low flying height pair of opposed 50% sliders patterned after slider 72 of FIG. 7 is illustrated in FIG. 8. The slider overall size and operating conditions are the same as those described in connection with FIG. 3. The slotted rail is defined by two outer sub-rails of 0.006 inch uniform width, two ambient longitudinal slots, and a CSR section (corresponding to CSR 74 of FIG. 7). The CSR section has a uniform width of 0.004 inch for the first 0.060 inch length of the CSR. The CSR width then gradually decreases to a width of 0.002 inch. After proceeding at a uniform width of 0.002 inch for a longitudinal length of 0.012 inch, the CSR width gradually increases back to a width of 0.004 inch at the slider trailing edge. The slot width is uniform at a value of 0.004 inch for a distance of 0.060 inch from the slider leading edge. Each slot outer boundary is straight, and each slot inner boundary coincides with one side edge of the CSR. Thus, the width of each slot varies in a longitudinal direction by 0.001 inch.

The resulting flying height contour for one of the sliders is presented in FIG. 8. The narrow section of each CSR reduces the flying height to a minimum value of 1.06 microinches. The location of the MIG head would correspond to the location of minimum flying height.

Although there is a hierarchy in the performance and price of high density magnetic heads, such comparisons are not presented here since all three of the high density heads described here (MR, TFI, MIG) provide for much higher data densities and data transfer rates than the conventional contact recording head of the 1.44 MByte industry standard floppy disk drive. In order to accommodate a TFI or MR head that is deposited at the slider trailing edge, the invention provides exemplary slider embodiments as described in greater detail hereinafter.

To explain how such new air bearing configurations will function with recording transducers that are deposited at the slider trailing edge, a brief review of the basic function of the narrow pressure relief slots of the '106 patent will be set forth. In the example that follows, the slotted rail is defined by two straight rectangular slots of 0.004 inch width which border a uniform width, 0.004 inch wide, central sub-rail (or central face) and two 0.006 inch wide outer sub-rails. The outermost side edges of the opposed sliders have a uniform width edge blend that is 0.002 inch wide, and the leading edge of each slider is blended over a 0.004 inch length. Each slider has the 50% industry standard size previously described. The disk thickness, elastic modulus, disk rotational speed, and radial location also have the same values considered in previous examples.

Figure 9:
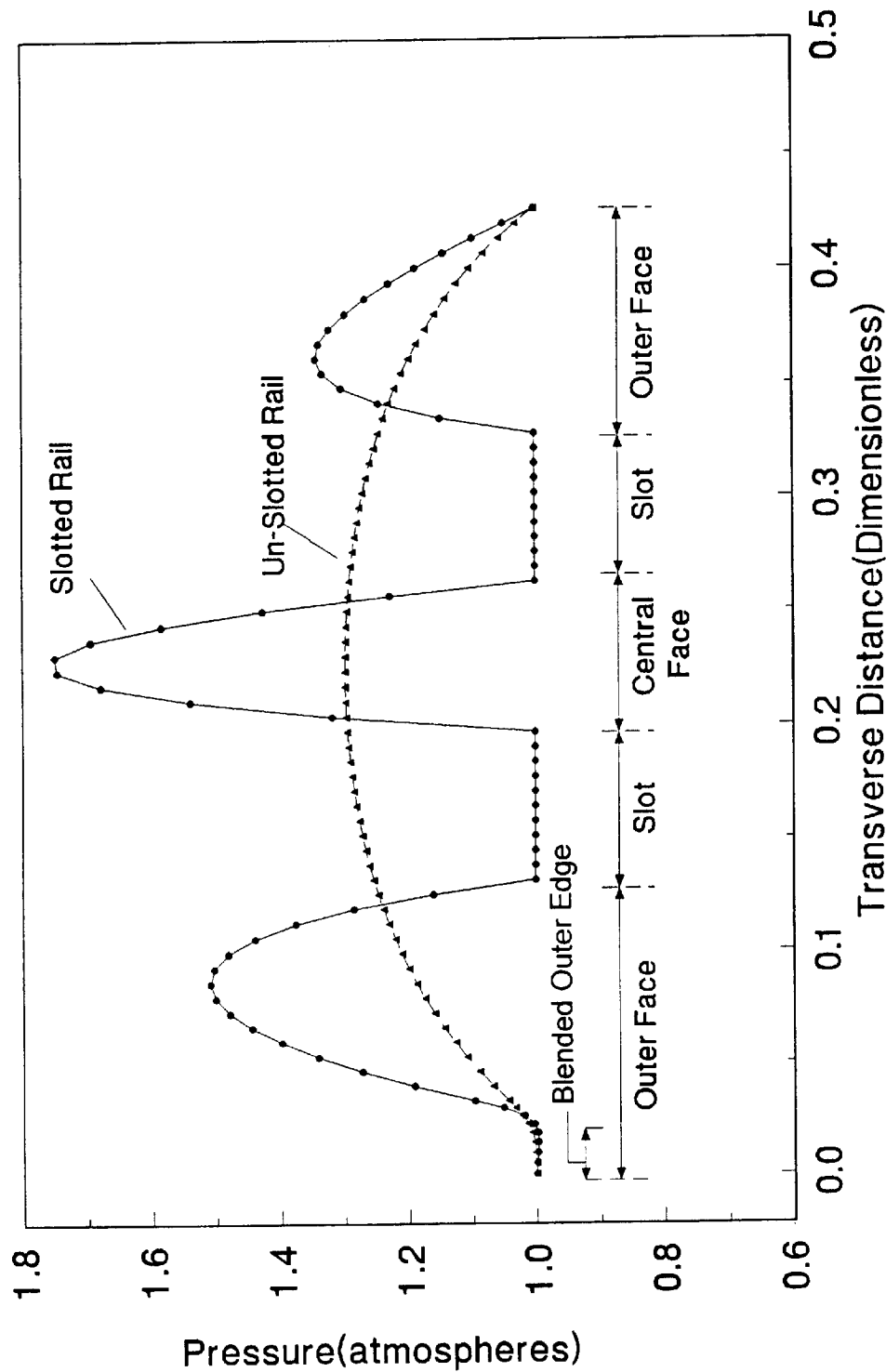
FIG. 9 illustrates a transverse plot of a resulting pressure profile on both sides of a floppy disk which is interposed between two sliders, each having two straight rectangular slots.

A typical transverse plot of the resulting pressure profile on both sides of the floppy disk is presented in FIG. 9 at a longitudinal distance of 86% from the slider leading edge. The pressure profiles over the three sub-rail sections of the slotted rail reach higher values than those of the opposite side of the disk where the head section is not slotted. The pressure levels of the slotted rail sections are higher because the slotted rail sections fly at lower flying height values than the opposing unslotted rail (HPP) section.

Figure 10:
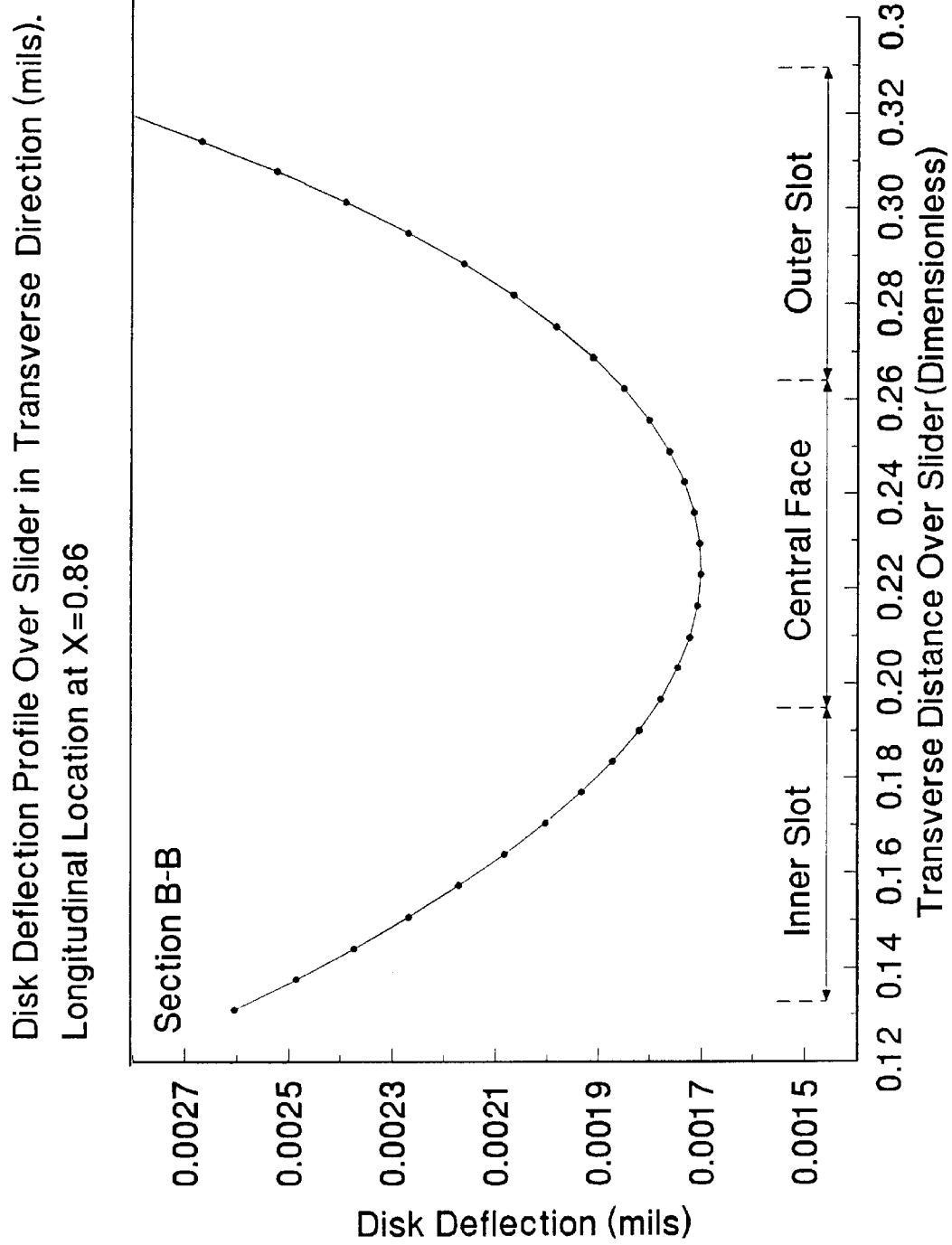
FIG. 10 illustrates the disk deflection in the transverse directional at a longitudinal distance of 86% from the leading edge of the slider of FIG. 9.

The corresponding disk deflection in the transverse direction at a longitudinal distance of 86% from the slider leading edge is presented in FIG. 10. Over the entire width of the opposing sliders, significant pressure differences exist on opposite sides of the disk. In order for these pressure differences to avoid a contact condition between slider and floppy disk surfaces, the disk must take on a deflection shape that will allow the transverse shear and bending moments that act on the disk cross-sectional area through its thickness to offset the imbalance of the pressure loading on the opposing sides of the disk. This requirement is especially critical over the longitudinal slots where the HPP loading on one side of the disk is not opposed by any air-bearing force in the ambient slots on the opposite disk side. The ambient slots must be wide enough to be able to ensure a near-ambient pressure level along the slot length, but they must be narrow enough so as to prevent contact of the disk with the slot edges. When the slots are properly dimensioned, the elastic properties of the flexible disk act to keep the disk from being drawn into the slots or from contacting the slot edges. The results presented in FIG. 10 show that the disk of this example is not drawn into the slots and does not approach the slot edges. The convex shape of the disk in the transverse direction allows the disk to avoid contact with the slider. The minimum flying height occurs near the middle of the CSR which would be the transverse location of a MIG head for such an application.

Figure 11:
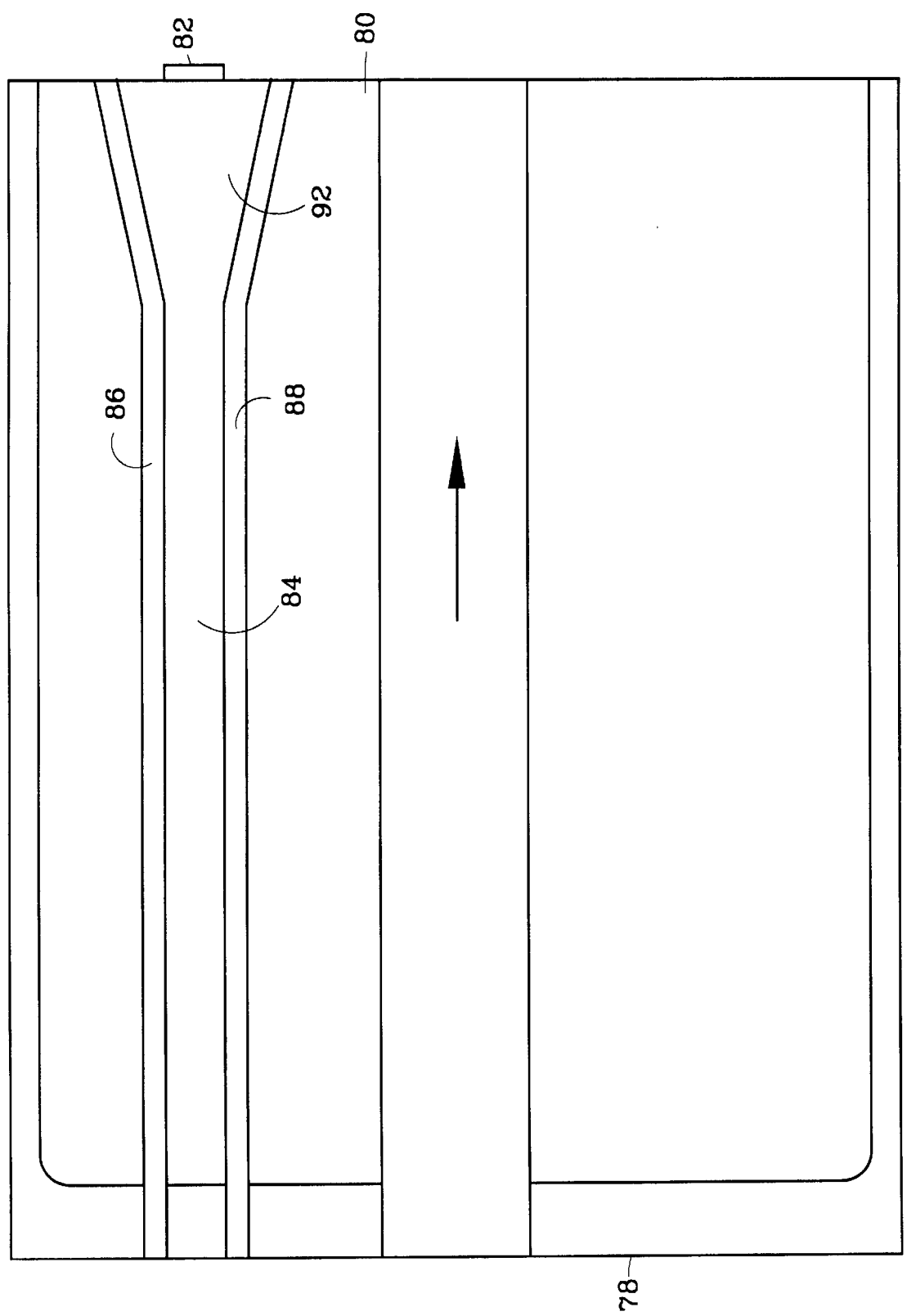
FIG. 11 is a top view of still another exemplary embodiment of a slider having a central sub-rail which varies in width near the trailing edge according to the invention.

An exemplary embodiment of a slider 78 which is useful in satisfying the flying height requirements of a TFI head 80 (or MR head) that is located at a trailing edge 82 of the slider is illustrated in FIG. 11. Slider 78 has a CSR 84 which increases in width near trailing edge 82 in order to accommodate head 80. In one quantitative example which is not meant to be limiting, CSR 84 is provided with a minimum width at trailing edge 82 which is at least 0.0096 inch. As set forth in the previous example, the slider having a uniform width rail of 0.0096 inch width produced a flying height value at the slider trailing edge of around four microinches. In this example, the desired trailing edge flying height of 1 to 2 microinches is achieved by use of a uniform width upstream CSR section followed by a variable width downstream CSR section. The CSR width is uniform (0.004 inch) and the two ALS 86 and 88 widths are both uniform (0.004 inch) for the first 0.074 inch portion of the 0.081 inch length slider. From a longitudinal value of 0.074 inch to the slider exit, the two longitudinal slots each diverge by an angle of 21.8° from the longitudinal direction in order produce the CSR width of 0.096 inch at trailing edge 82. The transverse width of each diverging slot remains at a constant value of 0.004 inch in order to provide the desired control of the flexible disk deflection in the vicinity of the slots near trailing edge 82. Except for the slotted rail geometry, all other parameters are the same as those used in the earlier uniform rail width example.

Based on prior art, one would not expect such a configuration to produce the desired flying height value at the slider CSR trailing edge due to the wide CSR width at the slider trailing edge. However, as indicated in the resulting flying height profile illustrated in FIG. 12, the flying height level at the trailing edge is in the desired range of 1 to 2 microinches. Importantly, two air-bearing effects take place near the slider trailing edge 82 that allow the flying height over the diverging trailing edge section of the CSR to remain at such a low value. First, the diverging side edges of the CSR cause the air flow that is convected over these diverging sections to enter the CSR with an ambient pressure level rather than the elevated pressure level that exists along the upstream uniform width portion of CSR 84. The ambient pressure level air flow entering the diverging portions of CSR 84 degrades the air-bearing effect of the CSR by diluting the pressure level over CSR 84 near trailing edge 82. This effect then promotes a low flying height value to exist near the CSR trailing edge 82.

Figure 13:
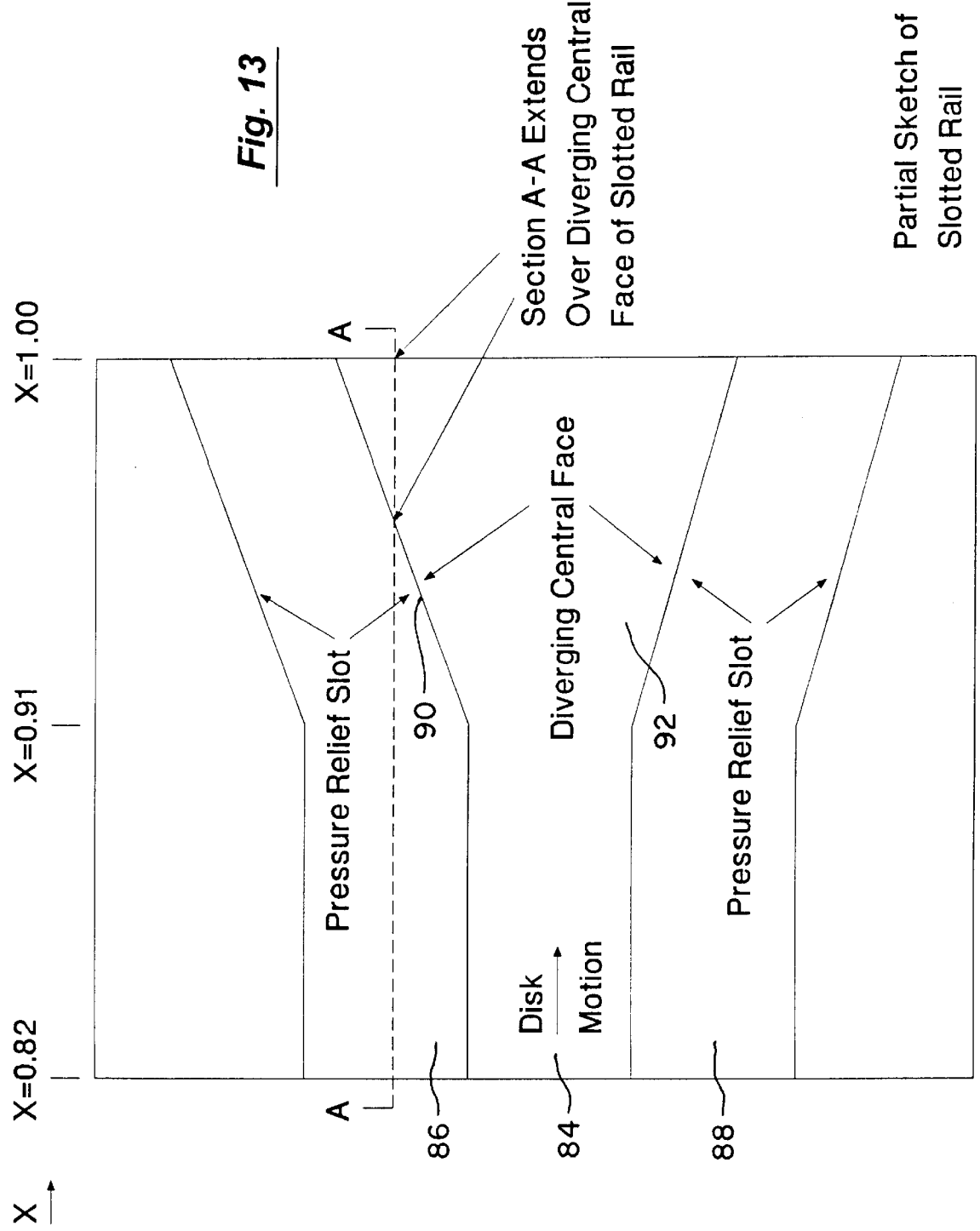
FIG. 13 is a more detailed view of the central sub-rail of the slider of FIG. 11 near the trailing edge.

Second, the longitudinal shape of the deflected disk near the slider trailing edge also promotes a low flying height value. A cross-section A—A is identified on FIG. 13 that runs longitudinally and extends the horizontal length of the sketch. FIG. 13 is a detailed view of the diverging face of CSR 84 of slider 78. Cross-section A—A is positioned to be in the center of ALS 86 upstream of the slot divergence. Further, section A—A intersects a leading edge 90 of a diverging section 92 of CSR 84 at a distance of about 96% from the slider leading edge.

Figure 14:
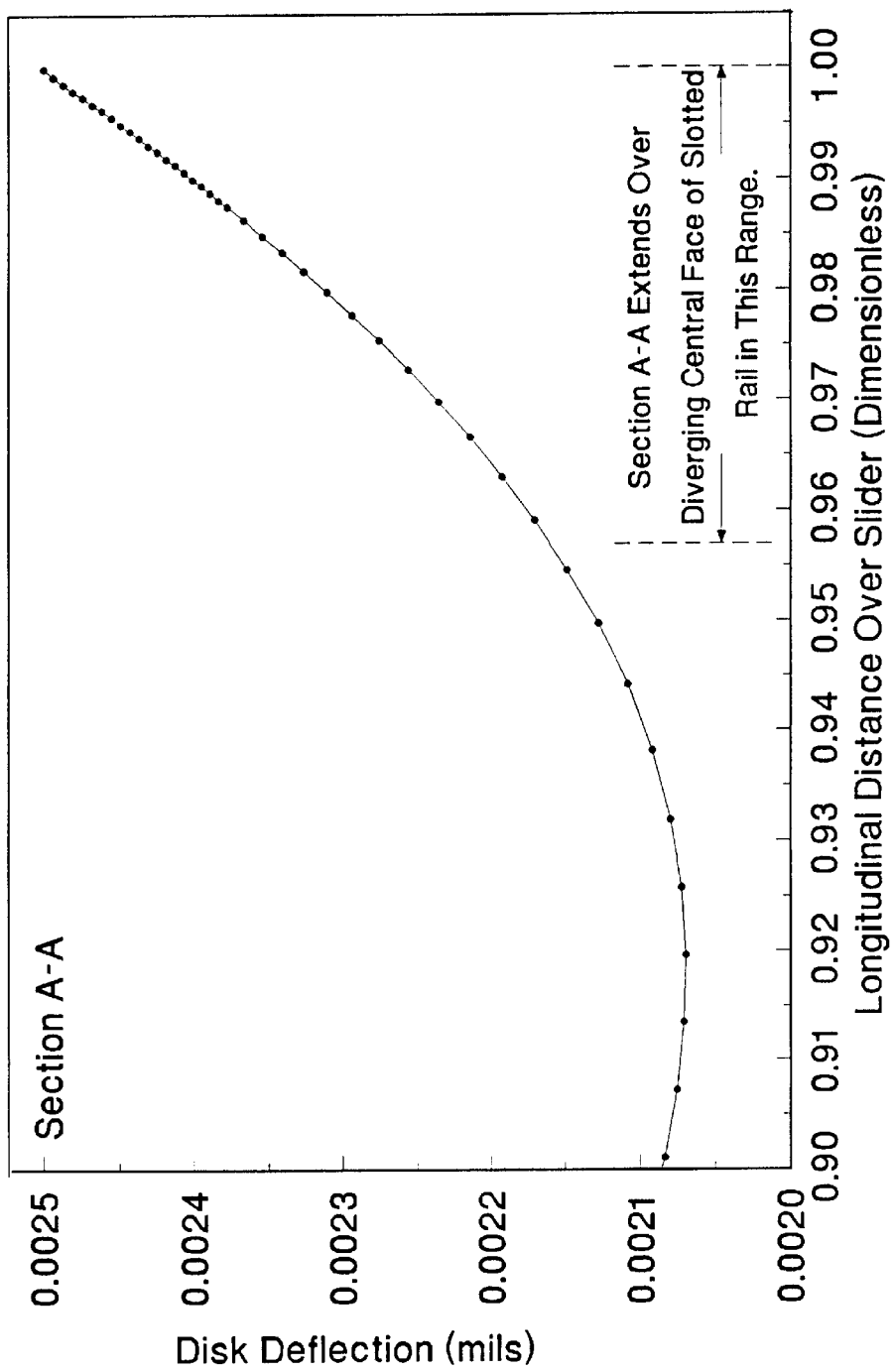
FIG. 14 depicts the disk deflection along the cross-section A—A of the slider of FIG. 13.
Figure 15:
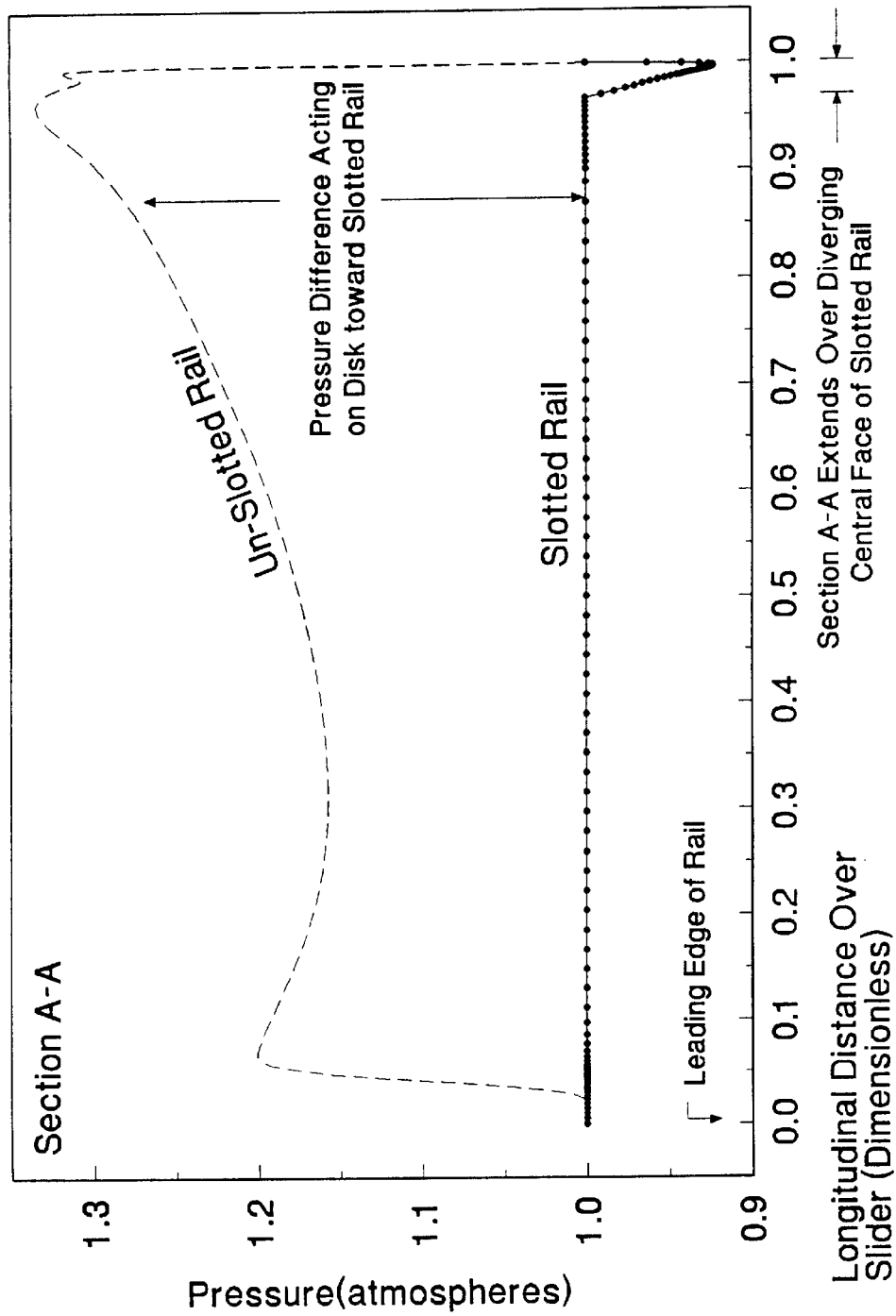
FIG. 15 depicts the air bearing pressure along section A—A of the slider of FIG. 13 for both sides of the disk.

The disk deflection along cross-section A—A in the vicinity of the diverging section is illustrated in FIG. 14. The air-bearing pressure along section A—A (and extending upstream to the slider inlet) is plotted in FIG. 15 for both sides of the disk. On the unslotted (HPP) side, the uninterrupted air-bearing pad produces a positive (above ambient) pressure along the slider length. On the slotted side of the disk, section A—A experiences only ambient pressure within the slotted section. Along section A—A, the unbalanced pressures acting on the two sides of the disk cause the disk to be drawn toward the slotted rail. However, the bending properties of the disk due to the presence of the relatively narrow longitudinal slot support the disk against the pressure imbalance. This tends to explain why the disk deflection takes on a minimum but noncontact value just upstream of the beginning of diverging section 92 of CSR 84 as shown in FIG. 14.

The disk motion in the longitudinal direction and the expanding air flow produced by the disk shape over the diverging section of CSR 84 cause a longitudinal pressure expansion across diverging section 92. The ambient pressure boundary on leading edge 90 of diverging section 92 and the resulting pressure expansion across diverging section 92 cause a subambient pressure to be created which is illustrated on the pressure plot of FIG. 15. Over diverging section 92, the net pressure difference acting on the flexible disk is substantial (see FIG. 15) and acts so as to produce a low flying height over the slotted rail.

A condition of non-contact exists near trailing edge 82 over diverging section 92 because of local stiffening of the disk in that region. In particular, slots 86 and 88 adjacent to diverging section 92 provide elastic property support because of the convex-shaped disk deflection in the transverse direction that extends beyond slots 86 and 88 and over diverging section 92. Further, the disk shape also develops a convex curvature in the longitudinal direction over the extent of diverging section 92 (as shown in FIG. 14). Such localized convex shapes in two respective directions each contribute to an increased local disk stiffness over diverging section 92 which enables the disk to support without contact the air-bearing pressure imbalance acting upon it.

Figure 12:
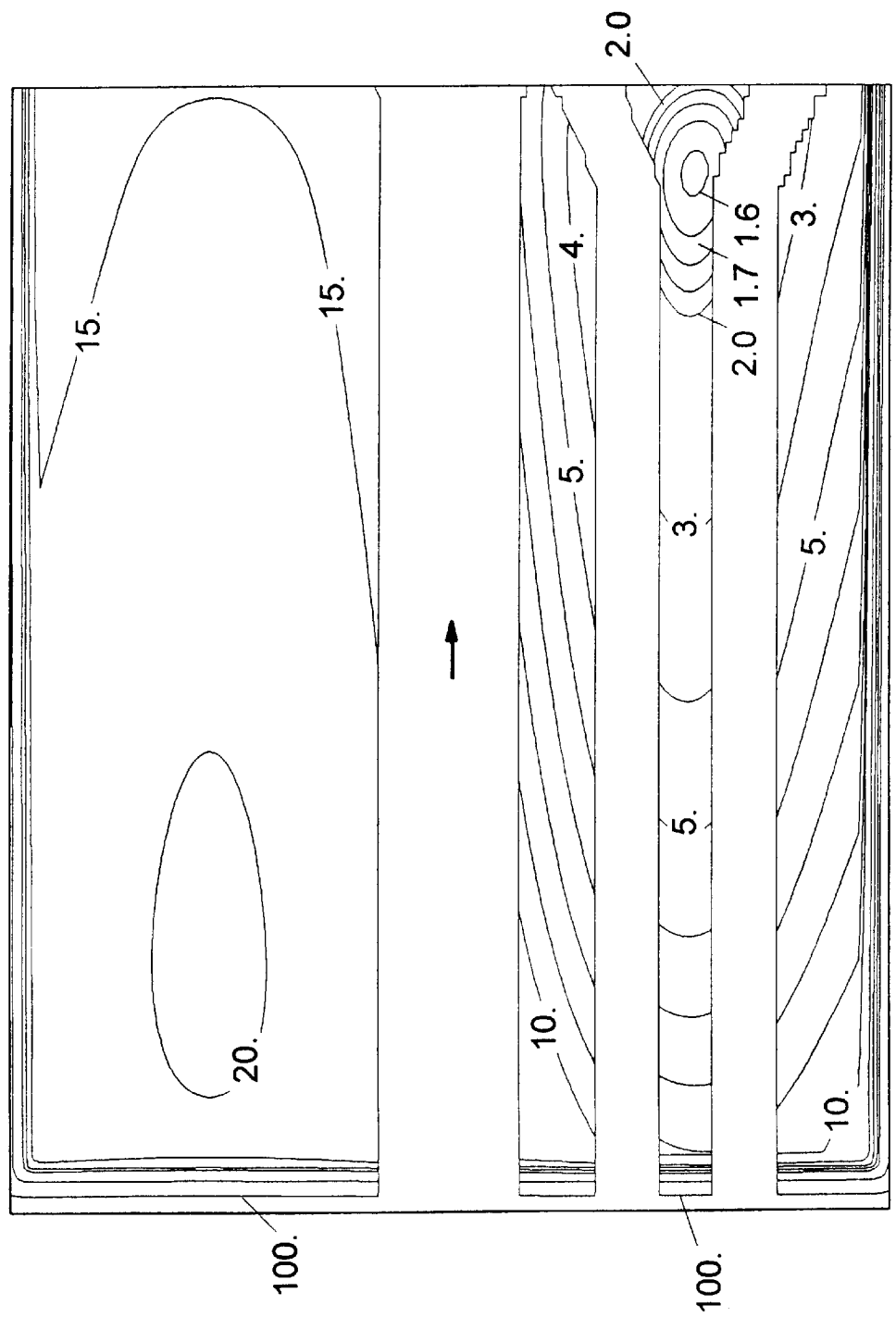
FIG. 12 illustrates a flying height profile produced when operating a pair of opposing sliders as illustrated in FIG. 11 over a flexible disk.
Figure 16:
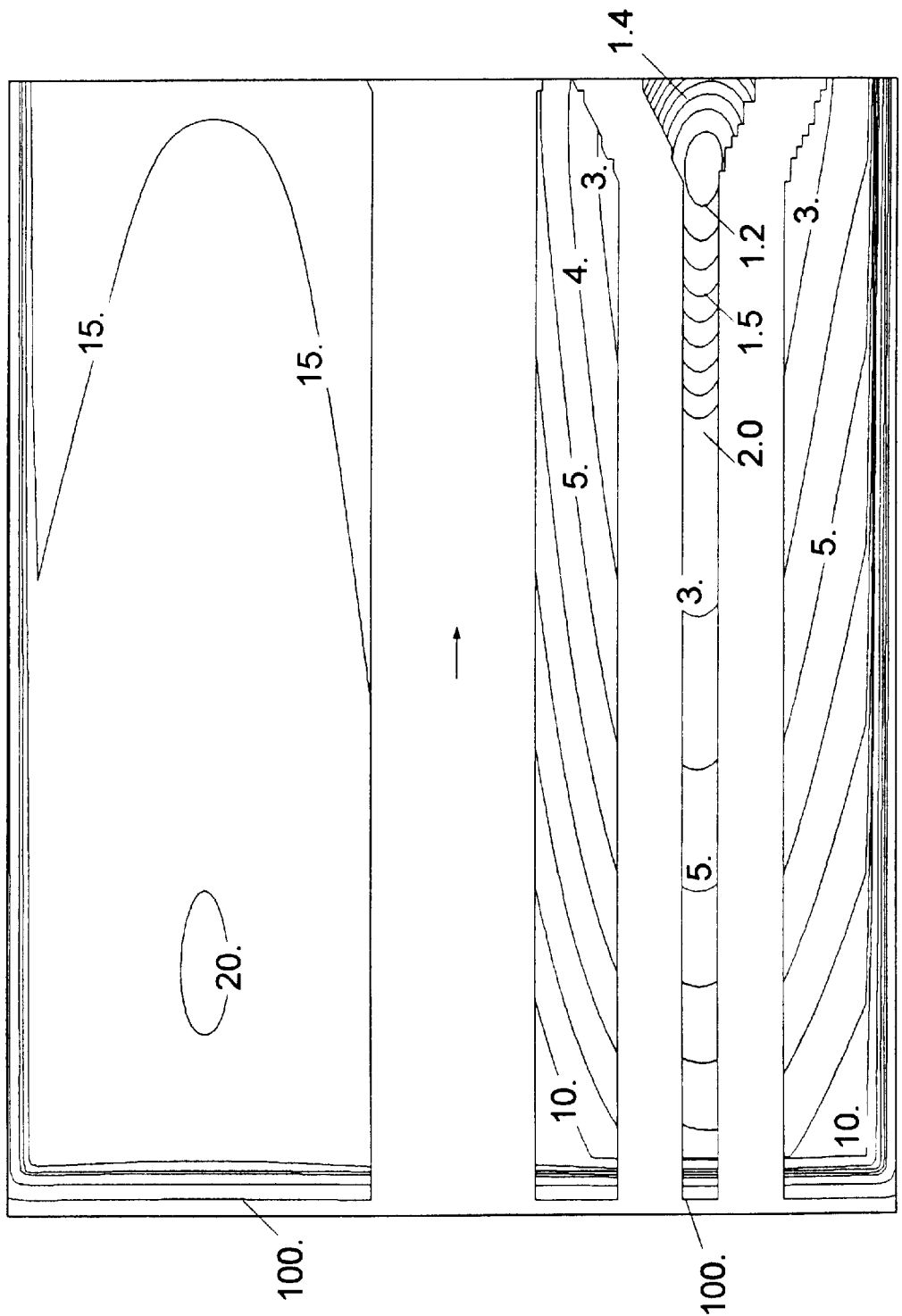
FIG. 16 depicts a flying height contour plot for the slider of FIG. 11 with the central sub-rail having a narrower width upstream portion.

In FIG. 12, the flying height is seen to change only a small amount over the diverging section of the CSR. Thus, by combining the diverging trailing edge section of the CSR with a narrow upstream CSR width, a low flying height may be delivered to a TFI or MR head deposited on a relatively wide trailing edge slider section. The trailing edge flying height level can be adjusted further by changing the width of the narrow upstream CSR section. If the uniform width of the upstream portion of CSR 84 is changed from 0.004 inch to 0.003 inch while the angle of divergence remains unchanged at 21.8°, the flying height contour plot will change to that shown in FIG. 16. As shown, the flying at the trailing edge is reduced by about 21%.

Figure 17:
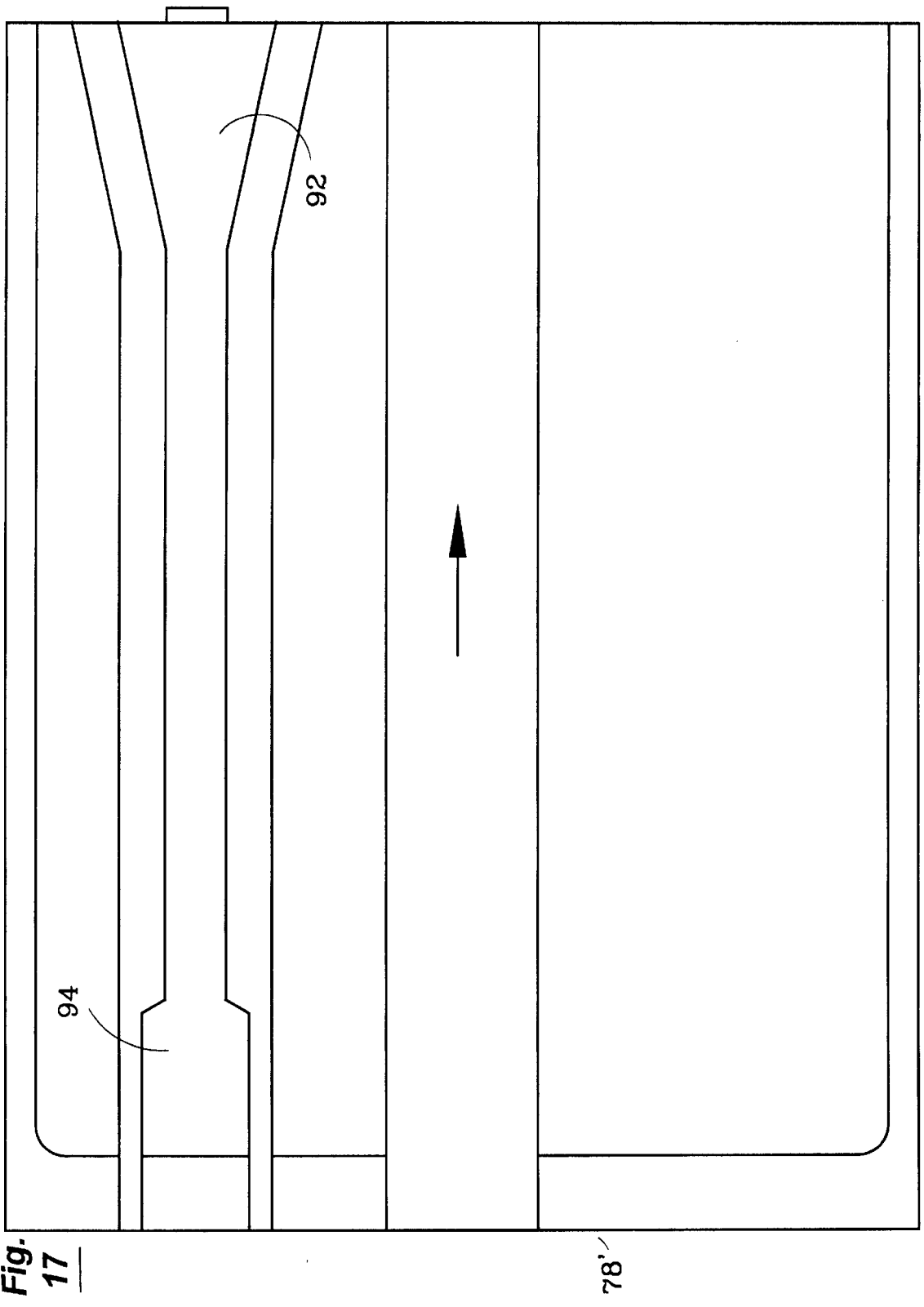
FIG. 17 is a top view of still yet another exemplary embodiment of a slider having a variable width central sub-rail according to the invention.
Figure 17A:
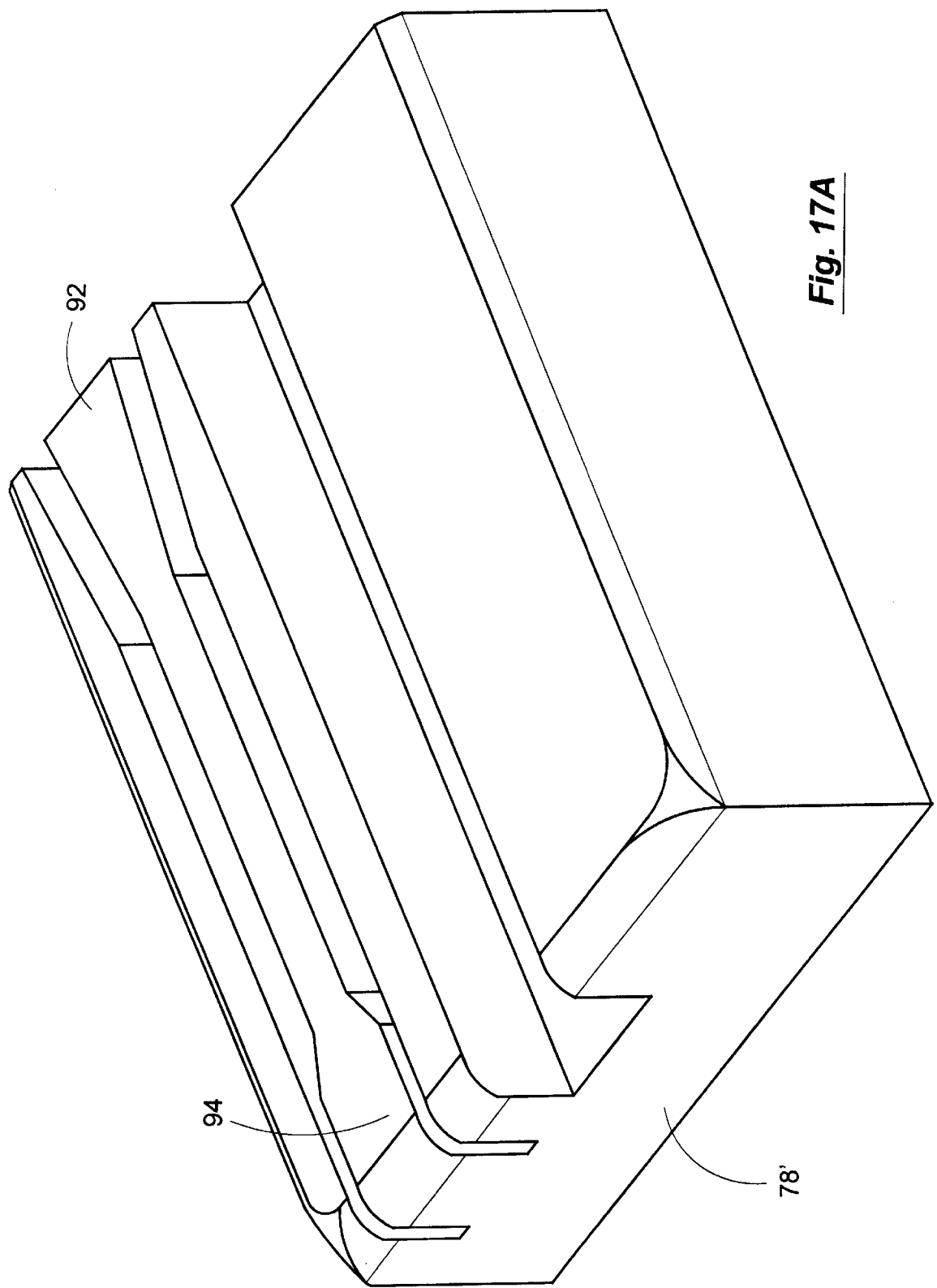
FIG. 17A is a perspective view of the slider shown in FIG. 17.
Figure 18:
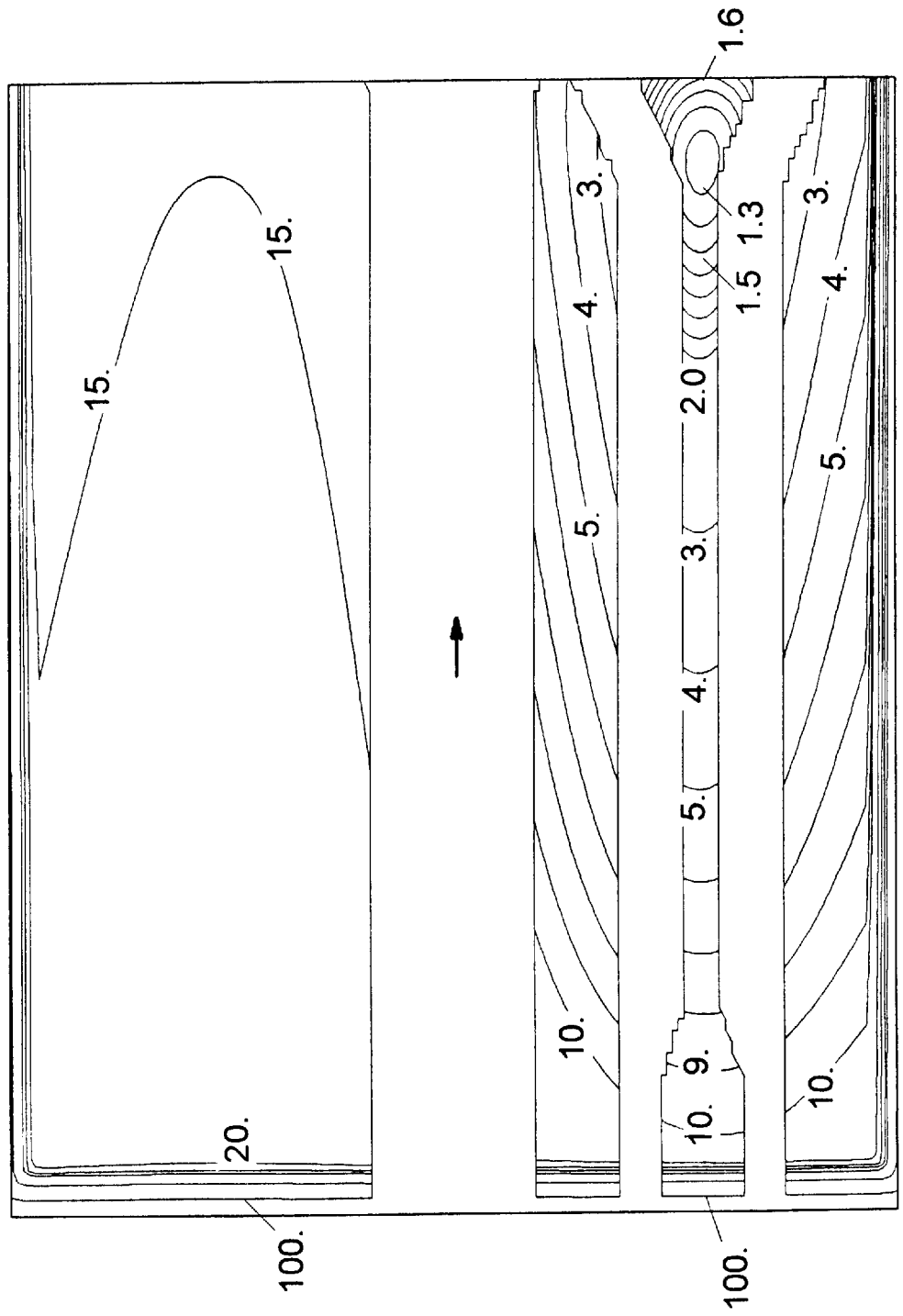
FIG. 18 depicts a flying height profile for the slider of FIG. 17.
Figure 19:
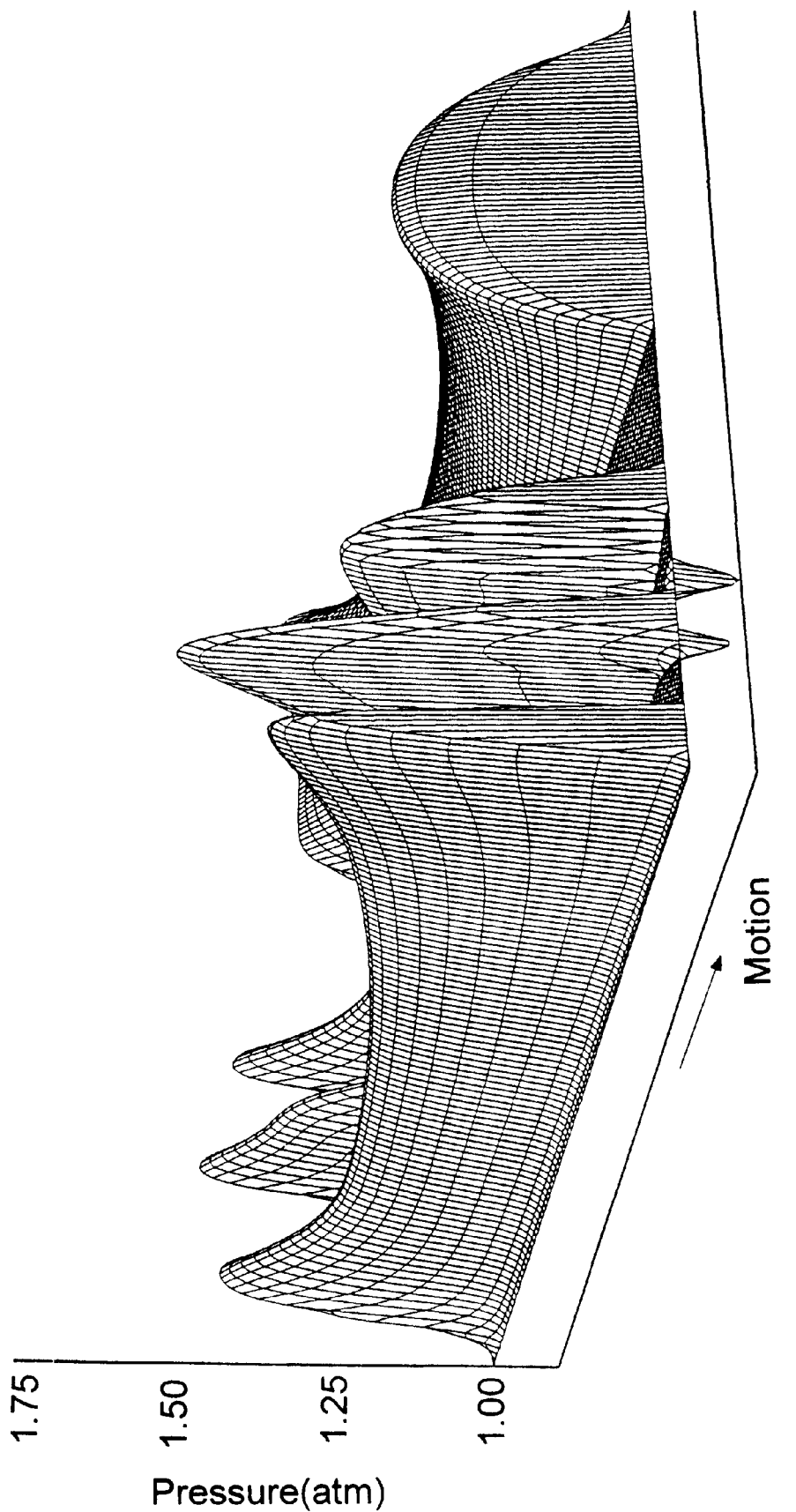
FIG. 19 is a three-dimensional plot of the air bearing pressure over both a slotted and an unslotted rail of the slider of FIG. 17.
Figure 20:
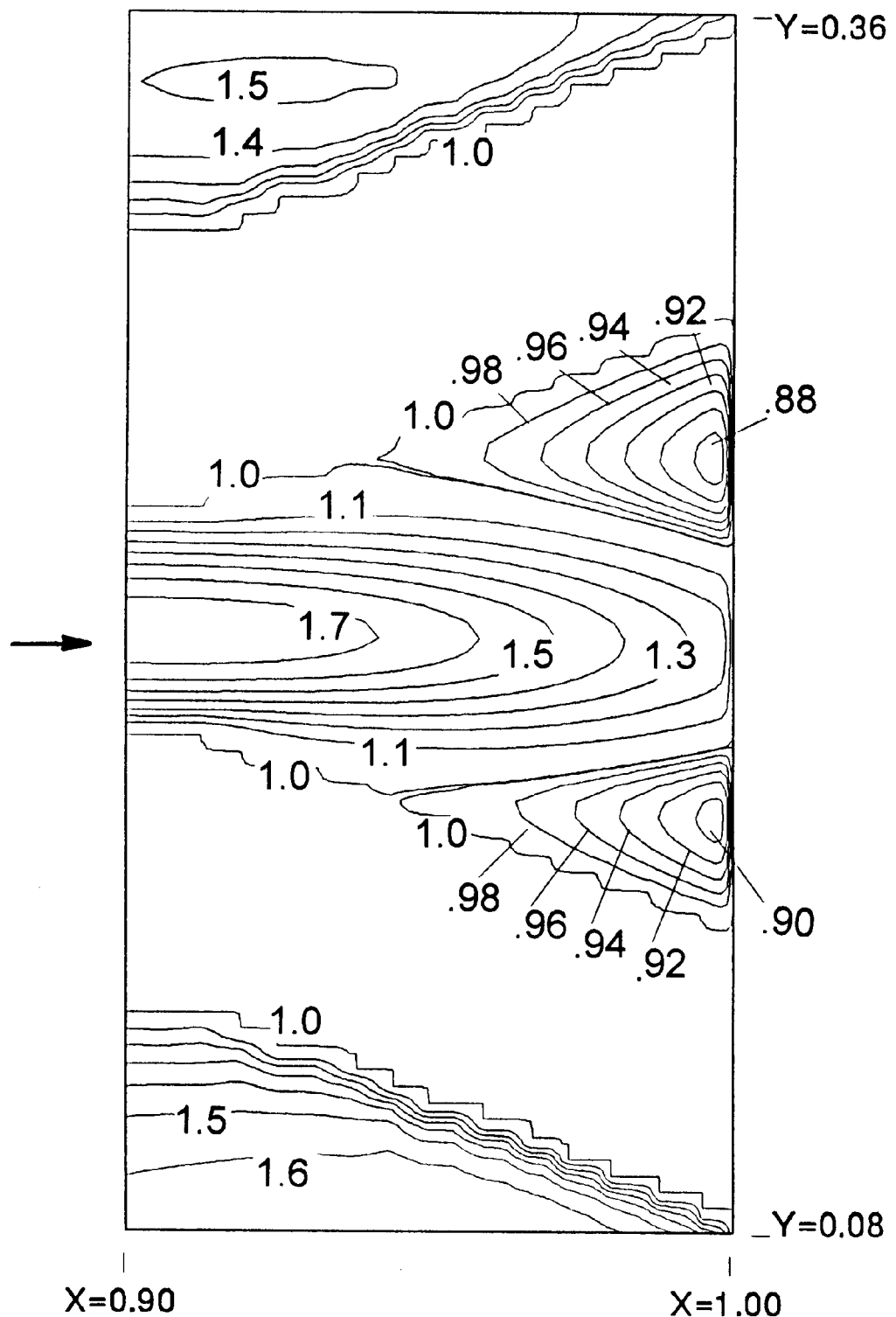
FIG. 20 is a contour pressure plot of a trailing edge portion of the slotted rail of FIG. 17.

As illustrated in FIG. 17, a slider 78' is provided and is similar to slider 78 except for the addition of a leading edge section 94 having an increased width. The slider shown in FIG. 17 is also shown in perspective view in FIG. 17A. The remainder of slider 78' is essentially identical to slider 78 as previously described. When providing leading edge section 94 with a width of 0.006 inch for the first 0.010 inch of longitudinal length, followed by a linear decrease in width from 0.006 inch to 0.003 inch over a longitudinal distance of 0.005 inch, a flying height profile is produced as illustrated in FIG. 18. This particular CSR geometry change causes very little change in trailing edge flying height but does cause the slider pitch angle to increase by 8%. The air-bearing pressure over the slotted and unslotted rail is given on a three-dimensional plot in FIG. 19. The subambient pressure over diverging section 92 may be observed on this plot. A contour pressure plot of a trailing edge portion of slider 78' of FIG. 17 (which includes diverging portion 92) is illustrated in FIG. 20 and shows quantitatively the subambient level of pressure developed over diverging section 92.

Figure 21:
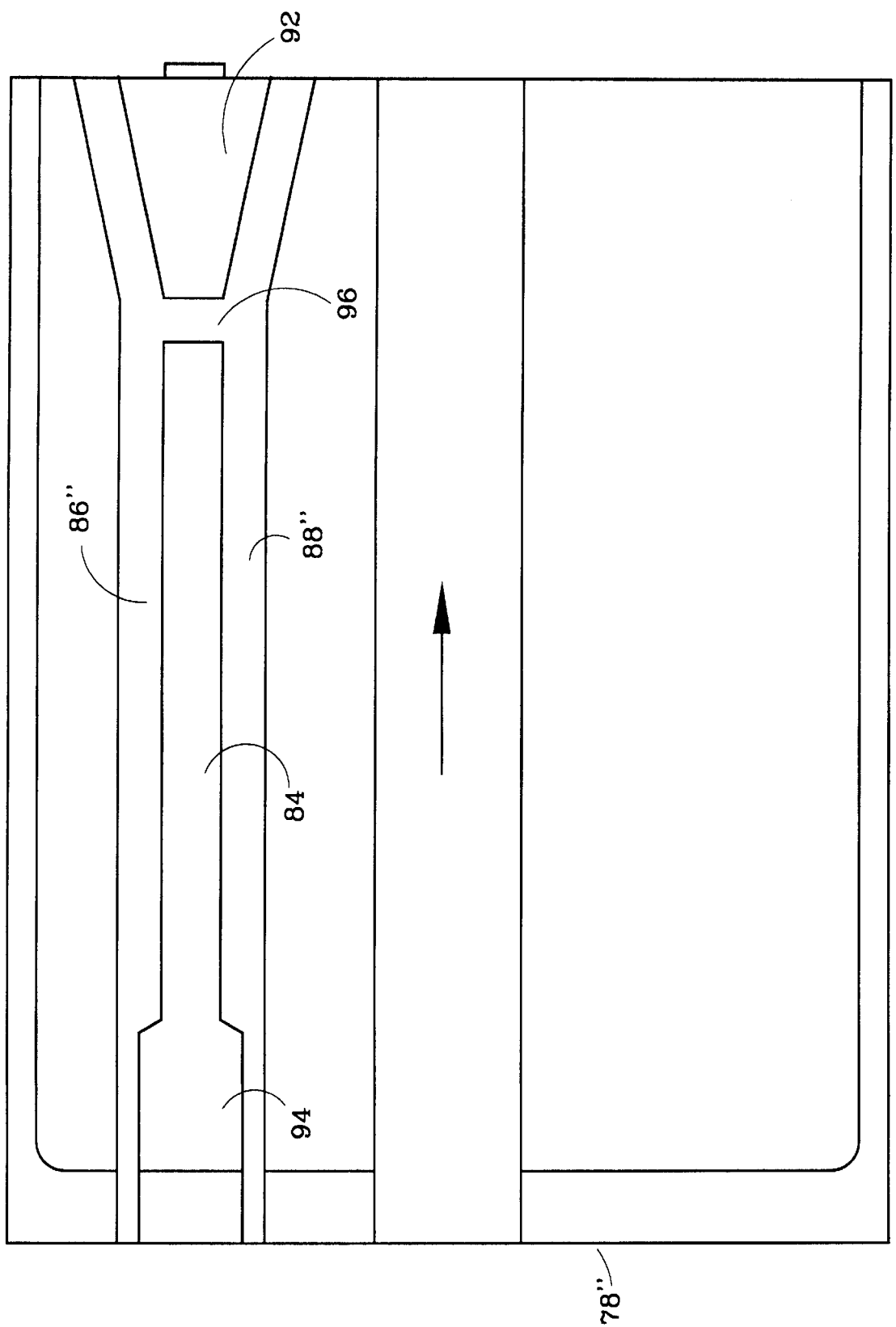
FIG. 21 is still another exemplary embodiment of a slider having a variable width sub-rail and an additional ambient pressure section according to the invention.
Figure 21A:
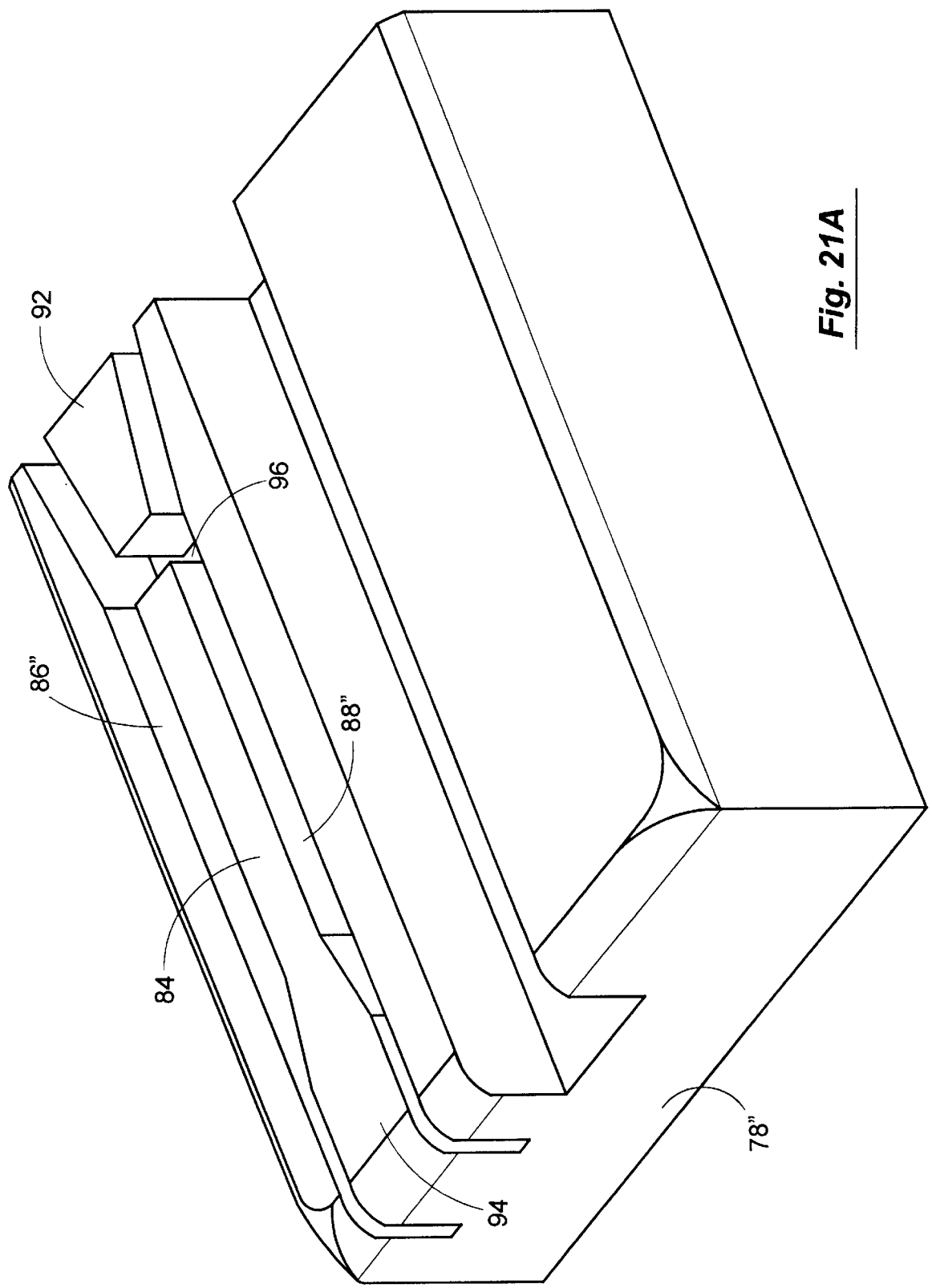
FIG. 21A is a perspective view of the slider shown in FIG. 21.

Slider 78' of FIG. 17 may be modified to include an additional ambient pressure section 96 as shown on a slider 78" of FIG. 21. The slider shown in FIG. 21 is also shown in perspective view in FIG. 21A. In all other aspects, the slider 78" of FIG. 21 is identical to slider 78' of FIG. 17. Additional ambient section 96 separates diverging section 92 from the rest of CSR 84. Additional ambient section 96 begins at a distance 0.073 inch from the slider leading edge and continues longitudinally for a distance of 0.003 inch. Additional ambient section 96 connects two ambient longitudinal slots 86" and 88" to each other and produces a discontinuous CSR. In this way, diverging section 92 is configured as an island, surrounded on all sides by ambient pressure. In this way, the resulting air-bearing pressure and flying height distribution over diverging section 92 are more heavily influenced by the pressure of the ambient pressure boundary than in early cases described herein where the diverging section was directly attached to the upstream portion of the CSR. In particular, in earlier cases described herein, the diverging section of the CSR was provided with upstream pressurized air flow by convection from the upstream portion of the CSR. A primary purpose of the upstream portion of the CSR with slider 78" is to provide, with air-bearing loading, a secondary position control of the disk surface as it approaches diverging section 92, in order to avoid slider-disk contact.

Figure 22:
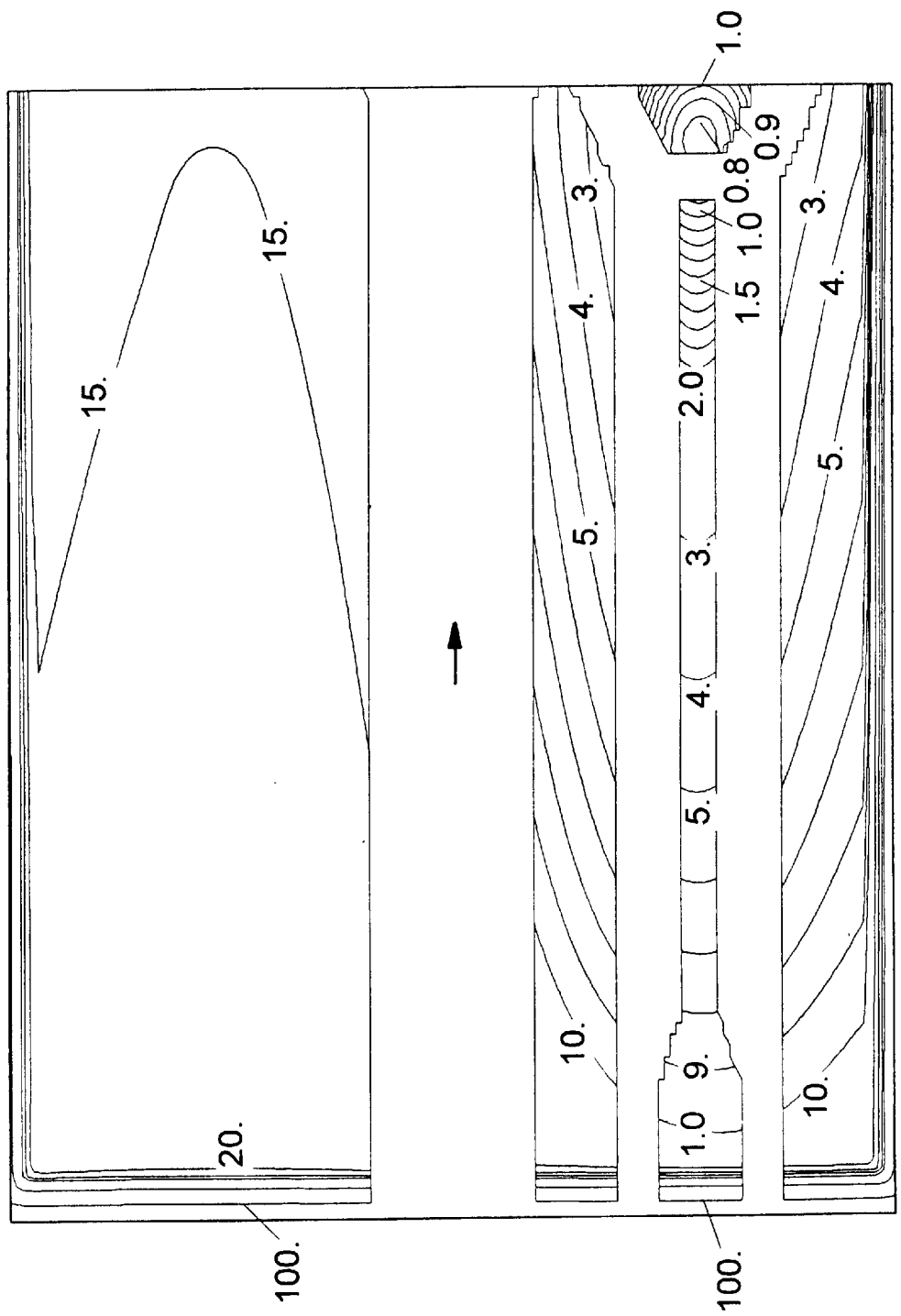
FIG. 22 illustrates a flying height contour plot for the slider of FIG. 21 when operated above a rotating recording medium.
Figure 23:
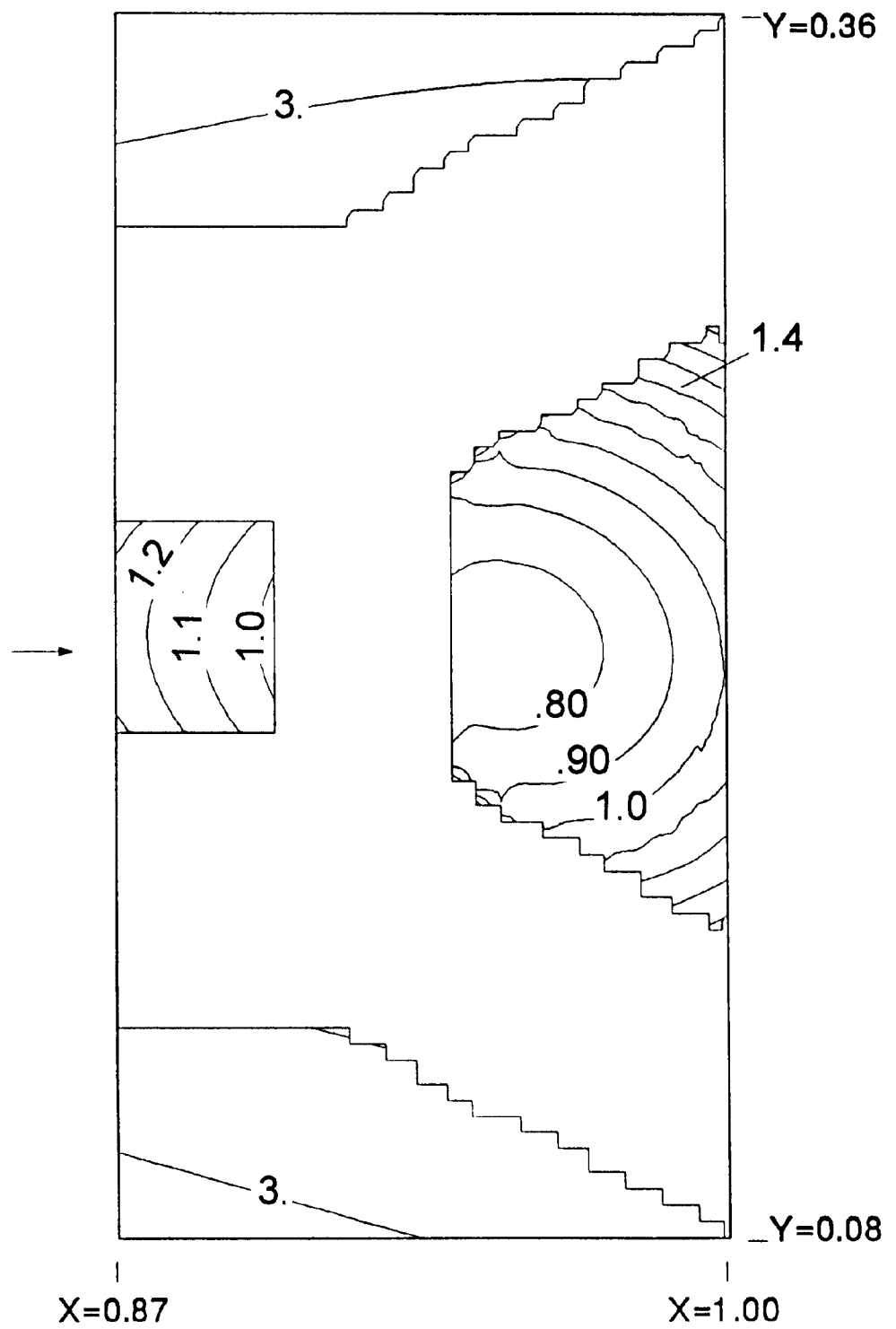
FIG. 23 is a more detailed view of flying height contours over the central sub-rail of FIG. 22 near the trailing edge.
Figure 24:
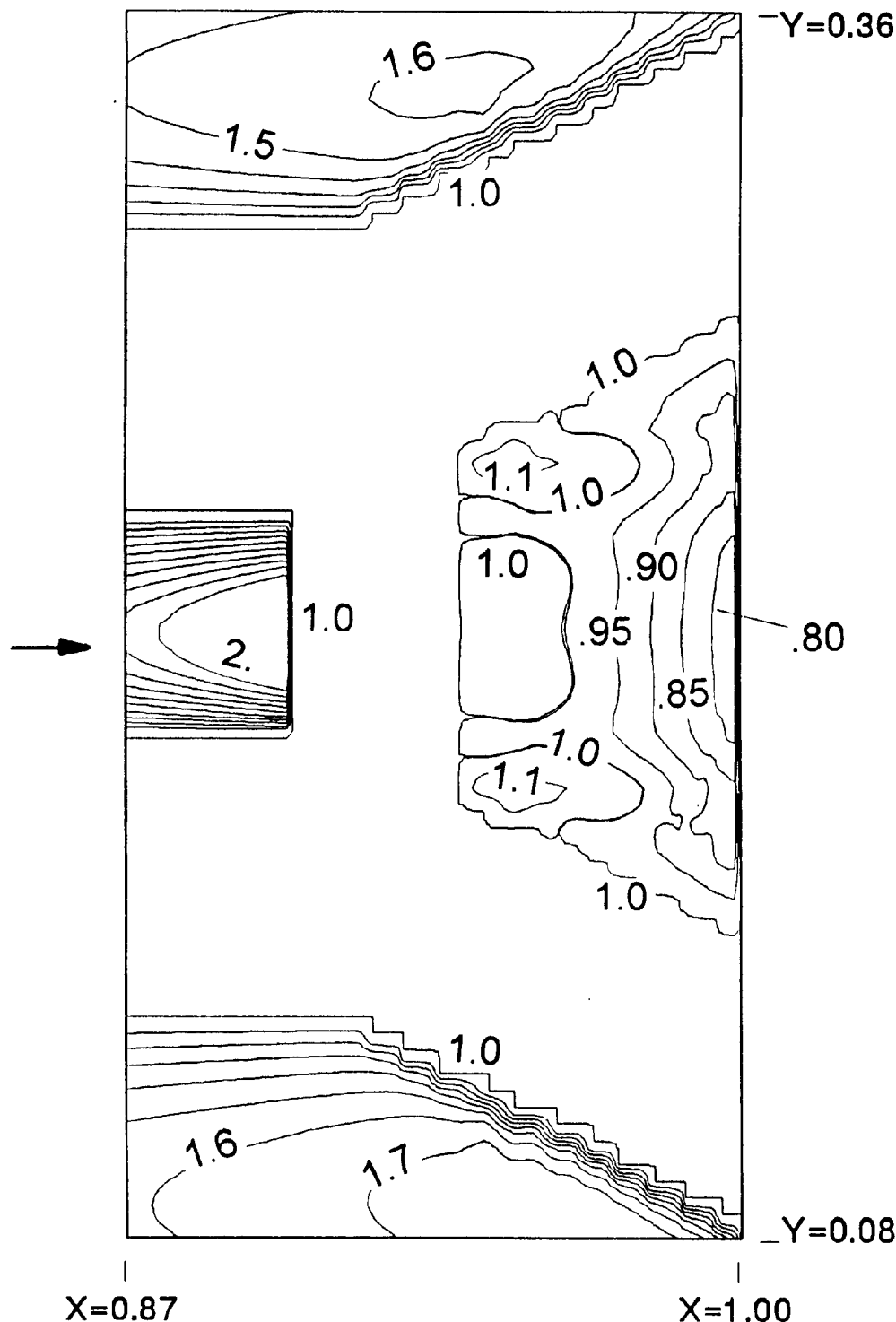
FIG. 24 is an air bearing pressure contour plot of the central sub-rail of the slider of FIG. 21 near the trailing edge.

The flying height contour plot for slider 78" is illustrated in FIG. 22 and indicates that the flying height value at the slider trailing edge has decreased by 38% from that of slider 78' which has a continuous CSR. Trailing edge flying height contour and air-bearing pressure contour plots are illustrated in FIGS. 23 and 24, respectively. As shown, the entire width of diverging section 92 is now occupied to some degree by subambient pressure levels. This is because the upstream periphery of the diverging section 92 is at an ambient pressure level and also because the disk is drawn toward the ambient region just upstream of this periphery by the HPP pressure loading on the opposite side of the disk. Air flow by convection due to the relative motion between disk and slider, and the expanding flow area in the longitudinal direction across the full width of the diverging section, then produce the subambient levels of pressure over diverging section 92. The substantial difference in pressure loading on the opposed sides of the disk then cause the flying height to be low over diverging section 92. As was the case with the diverging exit of slider 78' having a continuous CSR, contact near the slider trailing edge is prevented by localized increased disk stiffness effects which are present due to a convex disk shape in both the transverse and longitudinal directions over the diverging CSR. This allows disk transverse shear and bending moments to balance the force and moment loading on the disk surface caused by the opposed air film pressure distribution near the slider exit.

The examples described herein have been based on 50% sized sliders and disk speeds of 3,600 rpm. However, there are trends within the data storage industry toward smaller disk drives and components (sliders, disks, and the like) as applications tend to become more mobile and more portable. At the same time, disk rotational speeds tend to increase as a need for higher data transfer rates increase. The invention described herein is not limited by slider size (such as industry standard 100%, 70%, 50%, 30%, 25%, and the like, sized sliders) and is equally applicable to a wide range of disk speeds (such as 2,000, 2,400, 3,600, 4,500, 5,400, 7,200, 10,000 rpm and the like). The figures and examples described herein utilize rails which extend the full slider length. However, the invention is also applicable for the case where one or more rails occupies only a portion of the slider length. The figures and examples described herein utilize a disk modulus of elasticity value of 600,000 psi and a disk thickness value of 0.0025 inch. However, the invention described herein is not limited by these values. Other disk elastic modulus and disk thickness values may be used in order to achieve the desired benefits of the invention. The specific examples presented herein have been based on an opposed head configuration where one of the sliders is in a fixed position relative to the plane of the disk. However, the invention is also applicable when both opposing sliders are movable toward and away from the recording medium. In addition, the invention is also applicable when one of the opposing sliders is movable to and from the recording medium, and the second opposing slider is movable in at least one angular direction relative to the recording medium. The invention is not limited by the type of actuator that is used to position the sliders over the surfaces of the flexible disk. The invention is applicable for use with both linear and rotary actuators.

The invention has now been described in detail for purposes of clarity of understanding. However, it should be appreciated that certain changes and modifications may be practiced within the scope of the appended claims.

What is claimed is:

1. A slider arrangement for supporting an element in operative relation to a flexible moving recording medium, the slider arrangement comprising:

a first slider comprising a first rail having a first face positioned toward a first side of the recording medium; and a second slider comprising a leading edge, a trailing edge and a longitudinal axis therebetween, the second slider further comprising a second rail having a leading edge, a trailing edge, two side edges, and a second face positioned toward a second side of the recording medium, wherein the leading edge, the trailing edge, and the two side edges of the second rail are configured such that they are surrounded by air at a substantially ambient pressure level during motion of the recording medium, wherein at least one slot extends between the leading edge and the trailing edge of the second rail to divide the second rail into at least two sub-rails, with each sub-rail having opposing side edges, a leading edge and a trailing edge, wherein the leading edge and the trailing edge of each sub-rail coincide with at least a portion of the leading edge and the trailing edge, respectively, of the second rail, wherein the slot has a depth sufficient to allow the slot to contain air at a substantially ambient pressure level during motion of the recording medium, wherein each sub-rail has a width that is perpendicular to the longitudinal axis and which extends between the opposing side edges of the sub-rail, and wherein at least one of the sub-rails houses at least one read and/or write element and the width of said at least one sub-rail having the read and/or write element varies over at least a portion of the distance between the leading edge and the trailing edge of the sub-rail.

2. A slider arrangement as in claim 1, wherein the rail of the second slider includes two slots to partition the rail into two outer sub-rails and a central sub-rail, wherein each of the outer sub-rails and the central sub-rail has a width, wherein the central sub-rail contains at least one read and/or write element, and wherein the width of the central sub-rail varies over at least a portion of the distance between the leading edge and the trailing edge of the central sub-rail.

3. A slider arrangement as in claim 2, wherein the central sub-rail width increases toward the trailing edge over at least one portion of the distance between the leading edge and the trailing edge.

4. A slider arrangement as in claim 2, wherein the central sub-rail width increases toward the trailing edge over at least one portion of the distance between the leading edge and the trailing edge; and wherein the central sub-rail width decreases toward the trailing edge over at least one other portion of the distance between the leading edge and the trailing edge.

5. A slider arrangement as in claim 2, wherein the central sub-rail width decreases toward the trailing edge over at least one portion of the distance between the leading edge and the trailing edge.

6. A slider arrangement as in claim 2, wherein the central sub-rail has a width which increases near and in the direction toward the trailing edge so as to produce subambient pressure over a portion of the rail of the second slider.

7. A slider arrangement as in claim 2, wherein the central sub-rail has a width which increases near and in the direction toward the trailing edge, and wherein the two slots are each connected by a cross slot having a width and a depth to provide substantially ambient pressure within the cross slot during movement of the recording medium so as to produce subambient pressure over a portion of the rail of the second slider in the proximity of the trailing edge.

8. A slider arrangement as in claim 2, wherein the two slots are connected by an additional slot, wherein the additional slot has a width and a depth sufficient to provide substantially ambient pressure within the additional slot during movement of the recording medium.

9. A slider arrangement as in claim 2, wherein a width of at least one of the two longitudinal slots varies over at least a portion of the distance between the leading edge and the trailing edge.

10. A slider arrangement as in claim 2, wherein a width of each slot varies over at least a portion of the distance between the leading edge and the trailing edge.

11. A slider arrangement as in claim 2, wherein each slot has a substantially constant width.

12. A slider arrangement for supporting read and/or write elements in operative relation to a first and a second side of a flexible moving recording medium, the slider arrangement comprising:

a first slider having a leading edge, a trailing edge, and a longitudinal axis therebetween, the first slider comprising a first longitudinal rail and a second longitudinal rail, the first and the second longitudinal rails each having a leading edge, a trailing edge, two side edges and a face positioned toward the first side of the recording medium;

a second slider having leading edge, a trailing edge and a longitudinal axis therebetween, the second slider comprising a third longitudinal rail and a fourth longitudinal rail, the third and the fourth longitudinal rails each having a leading edge, a trailing edge, two side edges and a face positioned toward the second side of the recording medium; and a mounting device to mount the second slider relative to the recording medium substantially opposite of the first slider in a biased manner toward the recording medium, with the first rail being generally opposite the third rail and the second rail being generally opposite the fourth rail;

wherein the leading edge, the trailing edge, and the two side edges of the first and the fourth rails are configured such that they are surrounded by air at a substantially ambient pressure level during motion of the recording medium, wherein the first and the fourth rails each include at least one slot extending between the leading edge and the trailing edge of the first and fourth rails, respectively, to partition the first and the fourth rails each into at least two sub-rails, with each sub-rail having opposing side edges, a leading edge and a trailing edge, wherein the leading edge and the trailing edge of each sub-rail of the first and the fourth rails coincide with at least a portion of the leading edge and the trailing edge, respectively, of the first and the fourth rails, respectively, wherein each slot has a depth sufficient to allow the slot to contain air at a substantially ambient pressure level during motion of the recording medium, and wherein at least one of the sub-rails of the first and the fourth rails houses at least one read and/or write element and has a width that is perpendicular to the longitudinal axis and which extends between the opposing side edges of the sub-rail, and wherein the width varies over at least one portion of the distance between the leading edge and the trailing edge of the sub-rail.

13. A slider arrangement as in claim 12, wherein the slots are each sized sufficient to maintain a substantially ambient pressure environment within the slots during movement of the recording medium, wherein air films over the second and the third rails urge the recording medium toward the fourth rail and the first rail, with the slots serving to bleed off and convect away a portion of the pressurized air film located between the recording medium and the first and the fourth rail so as to produce a low flying height between the variable width sub-rails of the first and the fourth rails and the recording medium.

14. A slider arrangement as in claim 12, wherein the first and the fourth rails each include two slots to partition the first and the fourth rails each into two outer sub-rails and a central sub-rail, and wherein each of the outer sub-rails and the central sub-rail has a width.

15. A slider arrangement as in claim 14, wherein each central sub-rail width increases toward the trailing edge over at least one portion of the distance between the leading edge and the trailing edge.

16. A slider arrangement as in claim 14, wherein each central sub-rail width increases toward the trailing edge over at least one portion of the distance between the leading edge and the trailing edge; and wherein the central sub-rail width decreases toward the trailing edge over at least one other portion of the distance between the leading edge and the trailing edge.

17. A slider arrangement as in claim 14, wherein each central sub-rail width decreases toward the trailing edge over at least one portion of the distance between the leading edge and the trailing edge.

18. A slider arrangement as in claim 14, wherein each central sub-rail has a width which increases near and in the direction toward the trailing edge so as to produce subambient pressure over a portion of the first and the fourth longitudinal rails.

19. A slider arrangement as in claim 14, wherein each central sub-rail has a width which increases near and in the direction toward the trailing edge, and wherein the two slots of the first and the fourth rails are each connected by a cross slot having a width and a depth to provide substantially ambient pressure within each cross slot during movement of the recording medium so as to produce subambient pressure over a portion of the first and the fourth longitudinal rails in the proximity of the trailing edges.

20. A slider arrangement as in claim 14, wherein the two slots of the first and the fourth longitudinal rails are each connected by an additional slot, wherein each additional slot has a width and a depth sufficient to provide substantially ambient pressure within each additional slot during movement of the recording medium.

21. A slider arrangement as in claim 14, wherein the two slots of either the first or the fourth longitudinal rails are each connected by an additional slot, wherein the additional slot has a width and a depth sufficient to provide substantially ambient pressure within the additional slot during movement of the recording medium.

22. A slider arrangement as in claim 14, wherein at least a portion of one of the two slots of either the first longitudinal rail or the fourth longitudinal rail has a variable width.

23. A slider arrangement as in claim 14, wherein a width of at least one of the slots varies over at least a portion of the distance between the leading edge and the trailing edge.

24. A slider arrangement as in claim 14, wherein a width of each slot varies over at least a portion of the distance between the leading edge and the trailing edge.

25. A slider arrangement as in claim 12, further comprising a mounting device to mount the first slider relative to the recording medium substantially opposite of the second slider in a biased manner toward the recording medium such that the first slider is movable toward and away from the recording medium.

26. A slider arrangement as in claim 14, wherein the central sub-rails each house two read and/or write elements, wherein one of the elements comprises a low density transducer and the other element comprises a high density transducer.

27. A slider arrangement as in claim 14, wherein the read and/or write element comprises a thin film inductive head or a magnetoresistive head which is attached to the central sub-rail at the trailing edge.

28. A method for supporting read and/or write elements in operative relation to two sides of a flexible moving recording medium, the method comprising:

providing a first slider having a leading edge, a trailing edge, and a longitudinal axis therebetween, the first slider comprising a first longitudinal rail and a second longitudinal rail, each having a leading edge, a trailing edge, and two side edges;

providing a second slider having leading edge, a trailing edge and a longitudinal axis therebetween, the second slider comprising a third longitudinal rail and a fourth longitudinal rail, each having a leading edge, a trailing edge, and two side edges;

positioning the recording medium between the first and the second sliders, with the first rail being generally opposite the third rail and the second rail being generally opposite the fourth rail;

wherein the first and the fourth rails each include at least one slot extending between the leading edge and the trailing edge of the first and fourth rails, respectively, to partition the first and the fourth rails each into at least two sub-rails, with each sub-rail having opposing side edges, a leading edge and a trailing edge, wherein the leading edge and the trailing edge of each sub-rail of the first and the fourth rails coincide with at least a portion of the leading edge and the trailing edge, respectively, of the first and the fourth rails, respectively, and wherein at least one of the sub-rails of the first and the fourth rails houses at least one read and/or write element and has a width that is perpendicular to the longitudinal axis and which extends between the opposing side edges of the sub-rail, and wherein the width varies over at least one portion of the distance between the leading edge and the trailing edge of the sub-rail; and rotating the recording medium while maintaining an ambient pressure environment within the slots and around the leading edge, the trailing edge, and the two side edges of the first and the fourth rails, with air films developing over the second and the third rails to urge the recording medium toward the fourth rail and the first rail, and with the slots bleeding off and convecting away a portion of the pressurized air film located between the recording medium and the first and the fourth rail so as to produce a low flying height between the variable width sub-rails of the first and the fourth rails and the recording medium.

29. A method as in claim 28, further comprising rotating the recording medium at a speed that is greater than about 2000 rpm.

30. A method as in claim 28, wherein the sub-rails having the variable width portions each house two read and/or write elements, and wherein one of the elements comprises a low density transducer and the other element comprises a high density transducer.

31. A method as in claim 30, further comprising maintaining the first and the second sliders in a stable orientation with a desired pitch angle relative to the recording medium.

32. A method as in claim 31, further comprising maintaining the low density transducer and a specified first flying height and maintaining the high density transducer at a specified second flying height relative to the recording medium during rotation of the recording medium.

33. A method as in claim 28, wherein the first and the fourth rails each include two slots to partition the first and the fourth rails each into two outer sub-rails and a central sub-rail.

34. A method as in claim 33, wherein the read and/or write element comprises a thin film inductive head or a magnetoresistive head which is attached to the central sub-rail at the trailing edge.

35. A disk drive system comprising:

a housing;

a flexible recording medium operably mounted within the housing, the recording medium having a first side and a second side; and a slider arrangement supporting at least one read and/or write element in operative relation to the first and the second sides of the recording medium, wherein the slider arrangement comprises:

a first slider having a leading edge, a trailing edge, and a longitudinal axis therebetween, the first slider comprising a first longitudinal rail and a second longitudinal rail, the first and the second longitudinal rails each having a leading edge, a trailing edge, and two side edges and a face positioned toward the first side of the recording medium;

a second slider having leading edge, a trailing edge and a longitudinal axis therebetween, the second slider comprising a third longitudinal rail and a fourth longitudinal rail, the third and the fourth longitudinal rails each having a leading edge, a trailing edge, and two side edges and a face positioned toward the second side of the recording medium; and a mounting device to mount the second slider relative to the recording medium substantially opposite of the first slider in a biased manner toward the recording medium, with the first rail being generally opposite the third rail and the second rail being generally opposite the fourth rail;

wherein the leading edge, the trailing edge, and two side edges of the first and the fourth rails are configured such that they are surrounded by air at a substantially ambient pressure level during motion of the recording medium, wherein the first and the fourth rails each include at least one slot extending between the leading edge and the trailing edge of the first and fourth rails, respectively, to partition the first and the fourth rails each into at least two sub-rails, with each sub-rail having opposing side edges, a leading edge and a trailing edge, wherein the leading edge and the trailing edge of each sub-rail of the first and the fourth rails coincide with at least a portion of the leading edge and the trailing edge, respectively, of the first and the fourth rails, respectively, wherein each slot has a depth sufficient to allow the slot to contain air at a substantially ambient pressure level during motion of the recording medium, and wherein at least one of the sub-rails of the first and the fourth rails houses at least one read and/or write element and has a width that is perpendicular to the longitudinal axis and which extends between the opposing side edges of the sub-rail, and wherein the width varies over at least one portion of the distance between the leading edge and the trailing edge of the sub-rail.

36. A slider arrangement for supporting an element in operative relation to a flexible moving recording medium, the slider arrangement comprising:

a first slider comprising a rail having a face positioned toward a first side of the recording medium; and a second slider comprising a leading edge, a trailing edge and a longitudinal axis therebetween, the second slider further comprising a rail having a face positioned toward a second side of the recording medium and at least one ambient pressure slot extending between the leading edge and the trailing edge to divide the rail into at least two sub-rails, wherein the ambient pressure slot has a depth sufficient to allow the slot to contain air at a substantially ambient pressure level during motion of the recording medium, and wherein the slot has a width that is perpendicular to the longitudinal axis and which extends between opposing side edges of the two sub-rails, wherein the width of the slot varies over at least a portion of the distance between the leading edge and the trailing edge, and wherein at least one of the sub-rails houses at least one read and/or write element and the width of said at least one sub-rail having the read and/or write element varies over at least a portion of the distance between the leading edge and the trailing edge of the sub-rail.

37. A slider arrangement as in claim 36, wherein the rail of the second slider includes two slots to partition the rail into two outer sub-rails and a central sub-rail.

38. A slider arrangement as in claim 37, wherein the central sub-rail has a width which increases near and in the direction toward the trailing edge so as to produce subambient pressure over a portion of the rail of the second slider.

39. A slider arrangement as in claim 37, wherein the central sub-rail has a width which increases near and in the direction toward the trailing edge, and wherein the two slots are each connected by a cross slot having a width and a depth to provide substantially ambient pressure within the cross slot during movement of the recording medium so as to produce subambient pressure over a portion of the rail of the second slider in the proximity of the trailing edge.

40. A slider arrangement for supporting read and/or write elements in operative relation to a first and a second side of a flexible moving recording medium, the slider arrangement comprising:

a first slider having a leading edge, a trailing edge, and a longitudinal axis therebetween, the first slider comprising a first longitudinal rail and a second longitudinal rail, the first and the second longitudinal rails each having a face positioned toward the first side of the recording medium;

a second slider having leading edge, a trailing edge and a longitudinal axis therebetween, the second slider comprising a third longitudinal rail and a fourth longitudinal rail, the third and the fourth longitudinal rails each having a face positioned toward the second side of the recording medium; and a mounting device to mount the second slider relative to the recording medium substantially opposite of the first slider in a biased manner toward the recording medium, with the first rail being generally opposite the third rail and the second rail being generally opposite the fourth rail;

wherein the first and the fourth rails each include at least one ambient pressure slot extending between the leading edge and the trailing edge of the first and fourth rails, respectively, to partition the first and the fourth rails each into at least two sub-rails, wherein the ambient pressure slot has a depth sufficient to allow the slot to contain air at a substantially ambient pressure level during motion of the recording medium, and wherein at least one of the sub-rails of the first and the fourth rails houses at least one read and/or write element and has at least one portion which varies in width, and wherein at least one of the slots has a width that is perpendicular to the longitudinal axis and which extends between opposing side edges of the two sub-rails, and wherein the width of the slot varies over at least a portion of the distance between the leading edge and the trailing edge.

41. A slider arrangement as in claim 40, wherein the slots are each sized sufficient to maintain a substantially ambient pressure environment within the slots during movement of the recording medium, wherein air films over the second and the third rails urge the recording medium toward the fourth rail and the first rail, with the slots serving to bleed off and convect away a portion of the pressurized air film located between the recording medium and the first and the fourth rail so as to produce a low flying height between the variable width sub-rails of the first and the fourth rails and the recording medium.

42. A slider arrangement as in claim 40, wherein the first and the fourth rails each include two slots to partition the first and the fourth rails each into two outer sub-rails and a central sub-rail.

43. A slider arrangement as in claim 42, wherein each central sub-rail has a width which increases near and in the direction toward the trailing edge so as to produce subambient pressure over a portion of the first and the fourth longitudinal rails.

44. A slider arrangement as in claim 42, wherein each central sub-rail has a width which increases near and in the direction toward the trailing edge, and wherein the two slots of the first and the fourth rails are each connected by a cross slot having a width and a depth to provide substantially ambient pressure within each cross slot during movement of the recording medium so as to produce subambient pressure over a portion of the first and the fourth longitudinal rails in the proximity of the trailing edges.

45. A slider arrangement for supporting read and/or write elements in operative relation to a first and a second side of a flexible moving recording medium, the slider arrangement comprising:

a first slider having a leading edge, a trailing edge, and a longitudinal axis therebetween, the first slider comprising a first longitudinal rail and a second longitudinal rail, the first and the second longitudinal rails each having a leading edge, a trailing edge, two side edges and a face positioned toward the first side of the recording medium;

a second slider having leading edge, a trailing edge and a longitudinal axis therebetween, the second slider comprising a third longitudinal rail and a fourth longitudinal rail, the third and the fourth longitudinal rails each having a leading edge, a trailing edge, two side edges and a face positioned toward the second side of the recording medium;

a first mounting device to mount the first slider relative to the first side of the recording medium substantially opposite of the second slider in a biased manner toward the recording medium; and a second mounting device to mount the second slider relative to the second side of the recording medium substantially opposite of the first slider in a biased manner toward the recording medium, such that the first slider and the second slider are each movable toward and away from the recording medium, and wherein the first rail is generally opposite the third rail and the second rail is generally opposite the fourth rail;

wherein the leading edge, the trailing edge, and the two side edges of the first and the fourth rails are configured such that they are surrounded by air at a substantially ambient pressure level during motion of the recording medium, wherein the first and the fourth rails each include at least one slot extending between the leading edge and the trailing edge of the first and fourth rails, respectively, to partition the first and the fourth rails each into at least two sub-rails, with each sub-rail having opposing side edges, a leading edge and a trailing edge, wherein the leading edge and the trailing edge of each sub-rail of the first and the fourth rails coincide with at least a portion of the leading edge and the trailing edge, respectively, of the first and the fourth rails, respectively, wherein each slot has a depth sufficient to allow the slot to contain air at a substantially ambient pressure level during motion of the recording medium, and wherein at least one of the sub-rails of the first and the fourth rails houses at least one read and/or write element and has a width that is perpendicular to the longitudinal axis and which extends between the opposing side edges of the sub-rail, and wherein the width varies over at least one portion of the distance between the leading edge and the trailing edge of the sub-rail.

46. A slider arrangement for supporting read and/or write elements in operative relation to a first and a second side of a flexible moving recording medium, the slider arrangement comprising:

a first slider having a leading edge, a trailing edge, and a longitudinal axis therebetween, the first slider comprising a first longitudinal rail and a second longitudinal rail, the first and the second longitudinal rails each having a leading edge, a trailing edge, two side edges and a face positioned toward the first side of the recording medium;

a second slider having leading edge, a trailing edge and a longitudinal axis therebetween, the second slider comprising a third longitudinal rail and a fourth longitudinal rail, the third and the fourth longitudinal rails each having a leading edge, a trailing edge, two side edges and a face positioned toward the second side of the recording medium;

a first mounting device to mount the first slider relative to the first side of the recording medium substantially opposite of the second slider in a biased manner toward the recording medium; and a second mounting device to mount the second slider relative to the second side of the recording medium, such that the first slider is movable at least toward and away from the recording medium, and such that the second slider is movable in at least one angular direction relative to the recording medium, and wherein the first rail is generally opposite the third rail and the second rail is generally opposite the fourth rail;

wherein the leading edge, the trailing edge, and the two side edges of the first and the fourth rails are configured such that they are surrounded by air at a substantially ambient pressure level during motion of the recording medium, wherein the first and the fourth rails each include at least one slot extending between the leading edge and the trailing edge of the first and fourth rails, respectively, to partition the first and the fourth rails each into at least two sub-rails, with each sub-rail having opposing side edges, a leading edge and a trailing edge, wherein the leading edge and the trailing edge of each sub-rail of the first and the fourth rails coincide with at least a portion of the leading edge and the trailing edge, respectively, of the first and the fourth rails, respectively, wherein each slot has a depth sufficient to allow the slot to contain air at a substantially ambient pressure level during motion of the recording medium, and wherein at least one of the sub-rails of the first and the fourth rails houses at least one read and/or write element and has a width that is perpendicular to the longitudinal axis and which extends between opposing side edges of the sub-rail, and wherein the width varies over at least one portion of the distance between the leading edge and the trailing edge.

47. A disk drive system comprising:

a housing;

a flexible recording medium operably mounted within the housing, the recording medium having a first side and a second side; and a slider arrangement supporting at least one read and/or write element in operative relation to the first and the second sides of the recording medium, wherein the slider arrangement comprises:

a first slider having a leading edge, a trailing edge, and a longitudinal axis therebetween, the first slider comprising a first longitudinal rail and a second longitudinal rail, the first and the second longitudinal rails each having a leading edge, a trailing edge, two side edges and a face positioned toward the first side of the recording medium;

a second slider having leading edge, a trailing edge and a longitudinal axis therebetween, the second slider comprising a third longitudinal rail and a fourth longitudinal rail, the third and the fourth longitudinal rails each having a leading edge, a trailing edge, two side edges and a face positioned toward the second side of the recording medium;

a first mounting device to mount the first slider relative to the first side of the recording medium substantially opposite of the second slider in a biased manner toward the recording medium; and a second mounting device to mount the second slider relative to the second side of the recording medium substantially opposite of the first slider in a biased manner toward the recording medium, such that the first slider and the second slider are each movable toward and away from the recording medium, and wherein the first rail is generally opposite the third rail and the second rail is generally opposite the fourth rail;

wherein the leading edge, the trailing edge, and the two side edges of the first and the fourth rails are configured such that they are surrounded by air at a substantially ambient pressure level during motion of the recording medium, wherein the first and the fourth rails each include at least one slot extending between the leading edge and the trailing edge of the first and fourth rails, respectively, to partition the first and the fourth rails each into at least two sub-rails, with each sub-rail having opposing side edges, a leading edge and a trailing edge, wherein the leading edge and the trailing edge of each sub-rail of the first and the fourth rails coincide with at least a portion of the leading edge and the trailing edge, respectively, of the first and the fourth rails, respectively, wherein each slot has a depth sufficient to allow the slot to contain air at a substantially ambient pressure level during motion of the recording medium, and wherein at least one of the sub-rails of the first and the fourth rails houses at least one read and/or write element and has a width that is perpendicular to the longitudinal axis and which extends between the opposing side edges of the sub-rail, and wherein the width varies over at least one portion of the distance between the leading edge and the trailing edge of the sub-rail.

48. A disk drive system comprising:

a housing;

a flexible recording medium operably mounted within the housing, the recording medium having a first side and a second side; and a slider arrangement supporting at least one read and/or write element in operative relation to the first and the second sides of the recording medium, wherein the slider arrangement comprises:

a first slider having a leading edge, a trailing edge, and a longitudinal axis therebetween, the first slider comprising a first longitudinal rail and a second longitudinal rail, the first and the second longitudinal rails each having a leading edge, a trailing edge, two side edges and a face positioned toward the first side of the recording medium;

a second slider having leading edge, a trailing edge and a longitudinal axis therebetween, the second slider comprising a third longitudinal rail and a fourth longitudinal rail, the third and the fourth longitudinal rails each having a leading edge, a trailing edge, two side edges and a face positioned toward the second side of the recording medium;

a first mounting device to mount the first slider relative to the first side of the recording medium substantially opposite of the second slider in a biased manner toward the recording medium; and a second mounting device to mount the second slider relative to the second side of the recording medium, such that the first slider is movable at least toward and away from the recording medium, and such that the second slider is movable in at least one angular direction relative to the recording medium, and wherein the first rail is generally opposite the third rail and the second rail is generally opposite the fourth rail;

wherein the leading edge, the trailing edge, and the two side edges of the first and the fourth rails are configured such that they are surrounded by air at a substantially ambient pressure level during motion of the recording medium, wherein the first and the fourth rails each include at least one slot extending between the leading edge and the trailing edge of the first and fourth rails, respectively, to partition the first and the fourth rails each into at least two sub-rails, with each sub-rail having opposing side edges, a leading edge and a trailing edge, wherein the leading edge and the trailing edge of each sub-rail of the first and the fourth rails coincide with at least a portion of the leading edge and the trailing edge, respectively, of the first and the fourth rails, respectively, wherein each slot has a depth sufficient to allow the slot to contain air at a substantially ambient pressure level during motion of the recording medium, and wherein at least one of the sub-rails of the first and the fourth rails houses at least one read and/or write element and has a width that is perpendicular to the longitudinal axis and which extends between the opposing side edges of the sub-rail, and wherein the width varies over at least one portion of the distance between the leading edge and the trailing edge of the sub-rail.

49. A slider arrangement as in any of claims 12, 40, 45 and 46, wherein at least one of the first rail and the fourth rail extends from the proximity of the leading edge to the proximity of the trailing edge of the first and the second sliders, respectively.

50. A disk drive system as in any of claims 35, 47 and 48, wherein at least one of the first rail and the fourth rail extends from the proximity of the leading edge to the proximity of the trailing edge of the first and the second sliders, respectively.

51. A method as in claim 28, wherein at least one of the first rail and the fourth rail extends from the proximity of the leading edge to the proximity of the trailing edge of the first and the second sliders, respectively.

52. A slider arrangement as in any of claims 1 and 36, wherein the rail of the second slider extends from the proximity of the leading edge to the proximity of the trailing edge of the second slider.

* * * * *